United States Patent
Anderson

(10) Patent No.: US 8,437,901 B2
(45) Date of Patent: May 7, 2013

(54) HIGH INTEGRITY COORDINATION FOR MULTIPLE OFF-ROAD VEHICLES

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 1104 days.

(21) Appl. No.: 12/251,628

(22) Filed: Oct. 15, 2008

(65) Prior Publication Data
US 2010/0094499 A1    Apr. 15, 2010

(51) Int. Cl.
  G05B 19/04 (2006.01)
  G06F 17/00 (2006.01)
  G06F 19/00 (2006.01)
  G05D 1/00 (2006.01)
  G05D 3/00 (2006.01)

(52) U.S. Cl.
  USPC .............. 701/23; 701/65; 701/117; 701/29.3; 701/410; 340/435; 340/438; 700/247; 700/253

(58) Field of Classification Search .......... 701/1, 23–25, 701/400, 408, 409, 438, 439, 482, 483, 484, 701/2, 3, 4, 10, 14, 22, 30–302, 410; 340/435, 340/436, 438, 901, 903, 988, 995.12, 995.25; 700/245–250, 253, 255, 257, 258, 259, 260
  See application file for complete search history.

(56) References Cited

U.S. PATENT DOCUMENTS

| | | | |
|---|---|---|---|
| 5,471,391 A | 11/1995 | Gudat et al. | |
| 5,646,844 A | 7/1997 | Gudat et al. | |
| 6,324,586 B1 | 11/2001 | Johnson | |
| 6,732,024 B2 | 5/2004 | Wilhelm Rekow et al. | |
| 6,741,921 B2 | 5/2004 | Cohen et al. | |
| 6,856,879 B2 | 2/2005 | Arakawa et al. | |
| 6,943,824 B2 | 9/2005 | Alexia et al. | |
| 7,054,716 B2 | 5/2006 | McKee et al. | |
| 7,734,386 B2 | 6/2010 | DelNero et al. | |
| 8,078,338 B2 | 12/2011 | Pack et al. | |
| 2002/0059320 A1 | 5/2002 | Tamaru | |
| 2004/0073337 A1 | 4/2004 | McKee et al. | |
| 2006/0089765 A1* | 4/2006 | Pack et al. | 701/23 |
| 2007/0021879 A1 | 1/2007 | Delnero et al. | |

(Continued)

FOREIGN PATENT DOCUMENTS

WO    2005103848    11/2005

OTHER PUBLICATIONS

U.S. Appl. No. 12/251,619, filed Oct. 15, 2008, Anderson.
European Search Report, May 30, 2011, 8 Pages.

(Continued)

*Primary Examiner* — Thomas Tarcza
*Assistant Examiner* — Edward Pipala
(74) *Attorney, Agent, or Firm* — Yee & Associates, P.C.

(57) ABSTRACT

The illustrative embodiments provide a method and apparatus for controlling and coordinating multiple vehicles. In one illustrative embodiment, machine behaviors are assigned to multiple vehicles performing a task. The vehicles are coordinated to perform the task using the assigned behaviors and a number of signals received from other vehicles and the environment during performance of the task. In another illustrative embodiment, a role is identified for each vehicle in a group of vehicles. A number of machine behaviors are assigned to each vehicle depending upon the identified role for the vehicle. The machine behaviors are selected from coordinating machine behaviors stored in a behavior library. Each vehicle is then coordinated to perform the task according to the role and machine behaviors assigned.

27 Claims, 11 Drawing Sheets

U.S. PATENT DOCUMENTS

| | | |
|---|---|---|
| 2007/0112700 A1 | 5/2007 | Den Haan et al. |
| 2007/0129869 A1 | 6/2007 | Gudat et al. |
| 2007/0198144 A1 | 8/2007 | Norris et al. |
| 2007/0219666 A1 | 9/2007 | Filippov et al. |
| 2009/0055636 A1* | 2/2009 | Heisig et al. ............ 712/244 |
| 2010/0094481 A1 | 4/2010 | Anderson |

OTHER PUBLICATIONS

P. Stone M. Veloso, "Task Decomposition, Dynamic Role Assignment, and Low-Bandwidth Communication for Real-Time Strategic Teamwork", 1999.

* cited by examiner

HIGH INTEGRITY COORDINATION FOR MULTIPLE OFF-ROAD VEHICLES

CROSS REFERENCE TO RELATED APPLICATIONS

This application is related to commonly assigned and co-pending U.S. patent application Ser. No. 12/251,619, filed on Oct. 15, 2008 and entitled "High Integrity Coordination System for Multiple Off-Road Vehicles", which is hereby incorporated by reference.

FIELD OF THE INVENTION

The present disclosure relates generally to systems and methods for vehicle navigation and more particularly systems and methods for high integrity coordination of multiple off-road vehicles. As an example, embodiments of this invention provide a method and system utilizing a versatile robotic control module for coordination and navigation of a vehicle.

BACKGROUND OF THE INVENTION

An increasing trend towards developing automated or semi-automated equipment is present in today's work environment. In some situations with this trend, the equipment is completely different from the operator-controlled equipment that is being replaced, and does not allow for any situations in which an operator can be present or take over operation of the vehicle. Such unmanned equipment can have cost and performance challenges due to the complexity of systems involved, the current status of computerized control, and uncertainty in various operating environments. As a result, semi-automated equipment is more commonly used. This type of equipment is similar to previous operator-controlled equipment, but incorporates one or more operations that are automated rather than operator-controlled. This semi-automated equipment allows for human supervision and allows the operator to take control when necessary.

SUMMARY

The illustrative embodiments provide a method and apparatus for controlling and coordinating multiple vehicles. In one illustrative embodiment, machine behaviors are assigned to multiple vehicles performing a task. The vehicles are coordinated to perform the task using the assigned behaviors and a number of signals received from other vehicles and the environment during performance of the task. In another illustrative embodiment, a role is identified for each vehicle in a group of vehicles. A number of machine behaviors are assigned to each vehicle depending upon the identified role for the vehicle. The machine behaviors are selected from coordinating machine behaviors stored in a behavior library. Each vehicle is then coordinated to perform the task according to the role and machine behaviors assigned.

In another illustrative embodiment, a vehicle is comprised of a high integrity machine controller, a steering system, a propulsion system, a braking system, a high integrity sensor system, a high integrity communication system, a library of machine behaviors; and a high integrity coordination system. The high integrity machine controller is connected to the steering system, the propulsion system, the braking system, the high integrity sensor system, the high integrity communication system, the library of machine behaviors, and the high integrity coordination system. The high integrity communications system provides communication between the vehicle, other vehicles, and the high integrity coordination system. The library of machine behaviors includes coordinating behaviors associated with tasks and specific behaviors associated with subtasks for directly and indirectly carrying out aspects of the tasks. The high integrity coordination system assigns a role to each vehicle for carrying out the aspects of the tasks, assigns a number of machine behaviors from the library of machine behaviors to the vehicles depending upon the role assigned, and coordinates the vehicle to perform the one or more tasks using the high integrity communication system.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
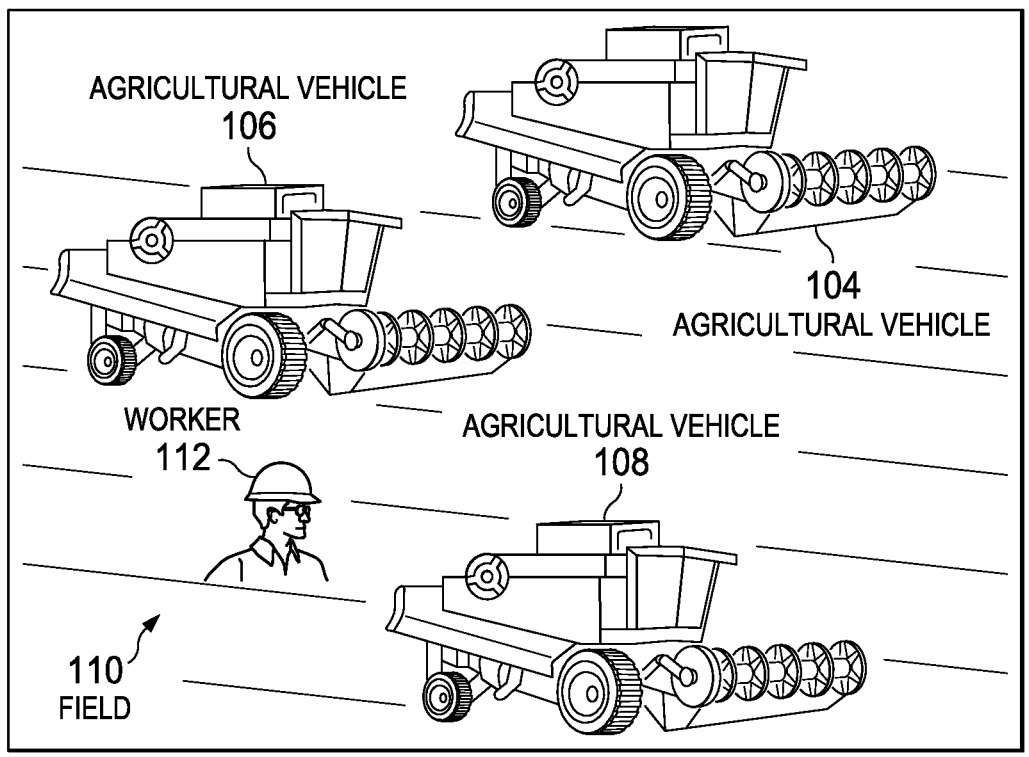
FIG. 1 is a block diagram of multiple vehicles operating in a network environment in which an illustrative embodiment may be implemented.

Embodiments of this invention provide systems and methods for vehicle coordination and more particularly systems and methods for coordinating multiple vehicles. As an example, embodiments of this invention provide a method and system for utilizing a versatile robotic control module for coordination and navigation of a vehicle.

Robotic or autonomous vehicles, sometimes referred to as mobile robotic platforms, generally have a robotic control system that controls the operational systems of the vehicle. In a vehicle that is limited to a transportation function, the operational systems may include steering, braking, transmission, and throttle systems. Such autonomous vehicles generally have a centralized robotic control system for control of the operational systems of the vehicle. Some military vehicles have been adapted for autonomous operation. In the United States, some tanks, personnel carriers, Stryker vehicles, and other vehicles have been adapted for autonomous capability. Generally, these are to be used in a teleoperated or manned mode as well.

Robotic control system sensor inputs may include data associated with the vehicle's destination, preprogrammed path information, and detected obstacle information. Based on such data associated with the information above, the vehicle's movements are controlled. Obstacle detection systems within a vehicle commonly use scanning lasers to scan a beam over a field of view, or cameras to capture images over a field of view. The scanning laser may cycle through an entire range of beam orientations, or provide random access to any particular orientation of the scanning beam. The camera or cameras may capture images over the broad field of view, or of a particular spectrum within the field of view. For obstacle detection applications of a vehicle, the response time for collecting image data should be rapid over a wide field of view to facilitate early recognition and avoidance of obstacles.

Location sensing devices include odometers, global positioning systems, and vision-based triangulation systems. Many location sensing devices are subject to errors in providing an accurate location estimate over time and in different geographic positions. Odometers are subject to material errors due to surface terrain. Satellite-based guidance systems, such as global positioning system-based guidance systems, which are commonly used today as a navigation aid in cars, airplanes, ships, computer-controlled harvesters, mine trucks, and other vehicles, may experience difficulty guiding when heavy foliage or other permanent obstructions, such as mountains, buildings, trees, and terrain, prevent or inhibit global positioning system signals from being accurately received by the system. Vision-based triangulation systems may experience error over certain angular ranges and distance ranges because of the relative position of cameras and landmarks.

In order to provide a system and method where multiple combination manned/autonomous vehicles accurately navigate and manage a work-site, specific mechanical accommodations for processing means and location sensing devices are required. Therefore, it would be advantageous to have a method and apparatus to provide additional features for navigation and coordination of multiple vehicles.

The illustrative embodiments recognize a need for a system and method where multiple combination manned/autonomous vehicles can accurately navigate and manage a work-site. Therefore, the illustrative embodiments provide a computer implemented method, apparatus, and computer program product for coordinating multiple vehicles. Machine behaviors are assigned to multiple vehicles performing a task. The vehicles are coordinated to perform the task using the assigned behaviors and a number of signals received from other vehicles and the environment during performance of the task. With reference to the figures and in particular with reference to FIG. 1, embodiments of the present invention may be used in a variety of vehicles, such as automobiles, trucks, harvesters, combines, agricultural equipment, construction equipment, tractors, mowers, armored vehicles, and utility vehicles. Embodiments of the present invention may also be used in a single computing system or a distributed computing system.

FIG. 1 depicts a block diagram of multiple vehicles operating in a network environment in accordance with an illustrative embodiment. FIG. 1 depicts an illustrative environment including network 100 in one embodiment of the present invention. In this example, back office 102 may be a single computer or a distributed computing cloud. Back office 102 supports the physical databases and/or connections to external databases which underlie the knowledge bases used in the different illustrative embodiments. Back office 102 may supply knowledge bases and coordination components to different vehicles, as well as provide online access to information from knowledge bases.

In this example, agricultural vehicles 104, 106, and 108 may be any type of harvesting, threshing, crop cleaning, combine/harvester, or other suitable agricultural vehicle. In this example, agricultural vehicles 104, 106, and 108 operate on field 110, which may be any type of land used to cultivate crops for agricultural purposes. Agricultural vehicles 104, 106, and 108 operate in a coordinated manner using high integrity systems. As used herein, "high integrity" when used to describe a component means that the component performs well across different operating environments. In other words, as the external environment changes to reduce the capability of components in a system or a component internally fails in the system, a level of redundancy is present in the number and the capabilities of remaining components to provide fail-safe or preferably fail-operational functioning without human monitoring or intervention.

Sensors, wireless links, and actuators are examples of components that may have a reduced capability in different operating environments. For example, a wireless communications link operating in one frequency range may not function well if interference occurs in the frequency range, while another communications link using a different frequency range may be unaffected. In another example, a high integrity coordination system has hardware redundancy that allows the system to continue to operate. The level of operation may be the same. The level of operation may be at a reduced level after some number of failures in the system, such that a failure of the system is graceful.

A graceful failure means that a system will not just fail entirely or stop working. The system may lose some level of functionality or performance after a failure of a hardware and/or software component, an environmental change, or from some other failure or event.

In the different illustrative embodiments, one or more of agricultural vehicles 104, 106, and 108 have a high integrity machine control system, a high integrity perception system, a high integrity coordination system, and a library of machine behaviors to coordinate execution of tasks with other vehicles.

In these examples, a high integrity coordination system is present in which coordination instructions may be transmitted using a high integrity communication system located on each vehicle to each of agricultural vehicles 104, 106, and 108 from a remote location, or may be transmitted from a control vehicle on field 110 to the other vehicles operating on field 110. In an illustrative embodiment, agricultural vehicle 104 may be a control vehicle that transmits coordination instructions to agricultural vehicles 106 and 108 during operation on field 110.

In an illustrative example, agricultural vehicle 104 may be a follower vehicle and agricultural vehicle 106 may be the leader vehicle. Agricultural vehicle 104 may move along field 110 following agricultural vehicle 106 using a number of different modes of operation to aid an operator in harvesting, threshing, or cleaning a crop. In another illustrative example, agricultural vehicles 104, 106, and 108 may coordinate their movements in order to execute a shared task at the same time, for example, harvesting sections of a field in a parallel manner. The modes include, for example, a side following mode, a teach and playback mode, a teleoperation mode, a path mapping mode, a straight mode, and other suitable modes of operation. An operator may be a person being followed as the leader when the vehicle is operating in a side-following mode, a person driving the vehicle, or a person controlling the vehicle movements in teleoperation mode.

In one example, in the side following mode, an operator is the leader and agricultural vehicle 104 is the follower. In another illustrative example, in the side following mode, another vehicle may be the leader and agricultural vehicle 104 may be the follower. In yet another illustrative example, agricultural vehicle 104 may be the leader with another vehicle following agricultural vehicle 104. In yet another illustrative example, a person, such as worker 112, may be in field 110 and agricultural vehicles 104, 106, and 108 may coordinate their movements to interact with worker 112, or to safely work alongside worker 112. In one illustrative embodiment, worker 112 may be the leader, and agricultural vehicles 104, 106, and 108 may be the followers, following worker 112 in a coordinated manner to perform a task in field 110.

The side following mode may include preprogrammed maneuvers in which an operator may change the movement of agricultural vehicle 104 from an otherwise straight travel path for agricultural vehicle 104. For example, if an obstacle is detected on field 110, the operator may initiate a go around obstacle maneuver that causes agricultural vehicle 104 to steer out and around an obstacle in a preset path.

With this mode, automatic obstacle identification and avoidance features may still be used. The different actions taken by agricultural vehicle 104 may occur with the aid of a coordination component in accordance with an illustrative embodiment. The coordination system used by agricultural vehicle 104 may be located within agricultural vehicle 104 and/or located remotely from a location, such as back office 102. In some embodiments, the coordination system may be distributed between vehicles or between a number of vehicles and a remote location.

In another example, an operator may drive agricultural vehicle 106 along a path on field 110 without stops, generating a mapped path. After driving the path, the operator may move agricultural vehicle 106 back to the beginning of the mapped path, and assign a common task to each of agricultural vehicles 104, 106 and 108 using the mapped path generated while driving agricultural vehicle 106 along the path on field 110. In the second pass on field 110, the operator may cause agricultural vehicles 104, 106 and 108 to drive the mapped path from start point to end point in parallel without stopping, or may cause agricultural vehicles 104, 106 and 108 to drive the mapped path in parallel with stops along the mapped path.

In this manner, agricultural vehicles 104, 106 and 108 drive from start to finish along the mapped path. Agricultural vehicles 104, 106 and 108 still may include some level of obstacle detection to keep agricultural vehicles 104, 106 and 108 from running over or hitting an obstacle, such as a field worker or another agricultural vehicle. These actions also may occur with the aid of a coordination component in accordance with an illustrative embodiment.

In a teleoperation mode, for example, an operator, in a remote location from the vehicle, may operate or wirelessly control agricultural vehicle 104 across field 110 in a fashion similar to other remote controlled vehicles. With this type of mode of operation, the operator may control agricultural vehicle 104 through a wireless controller.

In a path mapping mode, the different paths may be mapped by an operator prior to reaching field 110. With the harvesting example, paths may be identical for each pass of a field, though in parallel for multiple vehicles, the operator may rely on the fact that agricultural vehicles 104, 106, and 108 will move along the same path each time. Intervention or deviation from the mapped path may occur only when an obstacle is present. Also, in an illustrative embodiment, with the path mapping mode, way points may be set to allow agricultural vehicles 104, 106, and 108 to stop at grain collection points.

In a straight mode, agricultural vehicles 104, 106, and 108 may be placed in the middle or offset from some distance from an edge of field 110. Agricultural vehicles 104, 106, and 108 may move down field 110 along a straight line in parallel formation. In this type of mode of operation, the path of agricultural vehicles 104, 106, and 108 is always straight unless an obstacle is encountered. In this type of mode of operation, the operator may start and stop agricultural vehicles 104, 106, and 108 as needed. This type of mode may minimize the intervention needed by a driver. Some or all of the different operations in these examples may be performed with the aid of a coordination component in accordance with an illustrative embodiment.

In different illustrative embodiments, the different types of mode of operation may be used in combination to achieve the desired goals. In these examples, at least one of these modes of operation may be used to minimize driving while maximizing safety and efficiency in a harvesting process. In these examples, each of the multiple vehicles depicted may utilize each of the different types of mode of operation to achieve desired goals. As used herein, the phrase "at least one of" when used with a list of items means that different combinations of one or more of the items may be used and only one of each item in the list may be needed. For example, "at least one of item A, item B, and item C" may include, for example, without limitation, item A or item A and item B. This example also may include item A, item B, and item C or item B and item C. As another example, at least one of item A, item B, and item C may include item A, two of item B, and 4 of item C.

In different illustrative embodiments, dynamic conditions impact the movement of a vehicle. A dynamic condition is a change in the environment around a vehicle. For example, a dynamic condition may include, without limitation, movement of another vehicle in the environment to a new location, detection of an obstacle, detection of a new object or objects in the environment, change in soil or surface conditions, change in weather, change in sky obstruction, receiving user input to change the movement of the vehicle, receiving instructions from a back office, such as back office 102, system or component failure in a vehicle, and the like. In response to a dynamic condition, the movement of a vehicle may be altered in various ways, including, without limitation, stopping the vehicle, accelerating propulsion of the vehicle, decelerating propulsion of the vehicle, and altering the direction of the vehicle, for example.

Further, autonomous routes may include several straight blocks. In other examples, a path may go around blocks in a square or rectangular pattern. Of course, other types of patterns also may be used depending upon the particular implementation. Routes and patterns may be performed with the aid of a knowledge base in accordance with an illustrative embodiment. In these examples, an operator may drive agricultural vehicle 104 onto a field or to a beginning position of a path. The operator also may monitor agricultural vehicle 104 for safe operation and ultimately provide overriding control for the behavior of agricultural vehicle 104.

In these examples, a path may be a preset path, a path that is continuously planned with changes made by agricultural vehicle 104 to follow an operator in a side following mode, a path that is directed by the operator using a remote control in a teleoperation mode, or some other path. The path may be any length depending on the implementation. Paths may be stored and accessed with the aid of a knowledge base in accordance with an illustrative embodiment.

In these examples, heterogeneous sets of redundant sensors are located on multiple vehicles in a worksite to provide high integrity perception with fault tolerance. Redundant sensors in these examples are sensors that may be used to compensate for the loss and/or inability of other sensors to obtain information needed to control a vehicle. A redundant use of the sensor sets are governed by the intended use of each of the sensors and their degradation in certain dynamic conditions. The sensor sets robustly provide data for localization and/or safeguarding in light of a component failure or a temporary environmental condition. For example, dynamic conditions may be terrestrial and weather conditions that affect sensors and their ability to contribute to localization and safeguarding. Such conditions may include, without limitation, sun, clouds, artificial illumination, full moon light, new moon darkness, degree of sun brightness based on sun position due to season, shadows, fog, smoke, sand, dust, rain, snow, and the like.

In these examples, heterogeneous sets of redundant vehicle control components are located on multiple vehicles in a worksite to provide high integrity machine control with fault tolerance. Redundant vehicle control components in these examples are vehicle control components that may be used to compensate for the loss and/or inability of other vehicle control components to accurately and efficiently control a vehicle. For example, redundant actuators controlling a braking system may provide for fault tolerance if one actuator malfunctions, enabling another actuator to maintain control of the braking system for the vehicle and providing high integrity to the vehicle control system.

In these examples, heterogeneous sets of communication links and channels are located on multiple vehicles in a worksite to provide high integrity communication with fault tolerance. Redundant communication links and channels in these examples are communication links and channels that may be used to compensate for the loss and/or inability of other communication links and channels to transmit or receive data to or from another vehicle or a back office control system. Multiple communications links and channels may provide redundancy for fail-safe communications. For example, redundant communication links and channels may include AM radio frequency channels, FM radio frequency channels, cellular frequencies global positioning system receivers, Bluetooth receivers, Wi-Fi channels, and Wi-Max channels.

In these examples, redundant processors are located on multiple vehicles in a worksite to provide high integrity machine coordination with fault tolerance. The high integrity machine coordination system may share the physical processing means with the high integrity machine control system or have its own dedicated processors.

Thus, the different illustrative embodiments provide a number of different modes to operate a number of different vehicles, such as agricultural vehicles 104, 106, and 108. Although FIG. 1 illustrates a vehicle for harvesting or threshing agricultural crops, this illustration is not meant to limit the manner in which different modes may be applied. For example, the different illustrative embodiments may be applied to other types of vehicles and other types of uses. In an illustrative example, different types of vehicles may include controllable vehicles, autonomous vehicles, semi-autonomous vehicles, or any combination thereof.

As used herein, vehicles may include vehicles with legs, vehicles with wheels, vehicles with tracks, vehicles with rails, vehicles with wings, vehicles with propellers, vehicles with rudders, vehicles with rollers, and other types of vehicles for land, air, and water. For example, as used herein, a propeller may be used for an aircraft, a surface ship, a submarine, or another type of vehicle.

As a specific example, the different illustrative embodiments may be applied to a military vehicle in which a soldier uses a side following mode to provide a shield across a clearing. In other embodiments, the vehicle may have a chemical sprayer mounted and follow an operator as the operator applies chemicals to crops or other foliage. In another example, illustrative embodiments may be applied to golf and turf care vehicles. In still another example, the embodiments may be applied to forestry vehicles having functions, such as felling, bucking, forwarding, or other suitable forestry applications. In a fourth example, the embodiments may be applied to grading vehicles used to prepare a road bed or other construction site. In a fifth example, the embodiments may be applied to snow plows clearing a wide street or airport runway. These types of modes also may provide obstacle avoidance and remote control capabilities. As yet another example, the different illustrative embodiments may be applied to delivery vehicles, such as those for the post office or other commercial delivery vehicles.

In addition, the different illustrative embodiments may be implemented in any number of vehicles. For example, the different illustrative embodiments may be implemented in as few as two vehicles, or in four or five vehicles, or any number of multiple vehicles. Further, the different illustrative embodiments may be implemented in a heterogeneous group of vehicles or in a homogeneous group of vehicles. As one example, the illustrative embodiments may be implemented in a group of vehicles including a personnel carrier, a tank, and a utility vehicle. In another example, the illustrative embodiments may be implemented in a group of six utility vehicles.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

Figure 2:
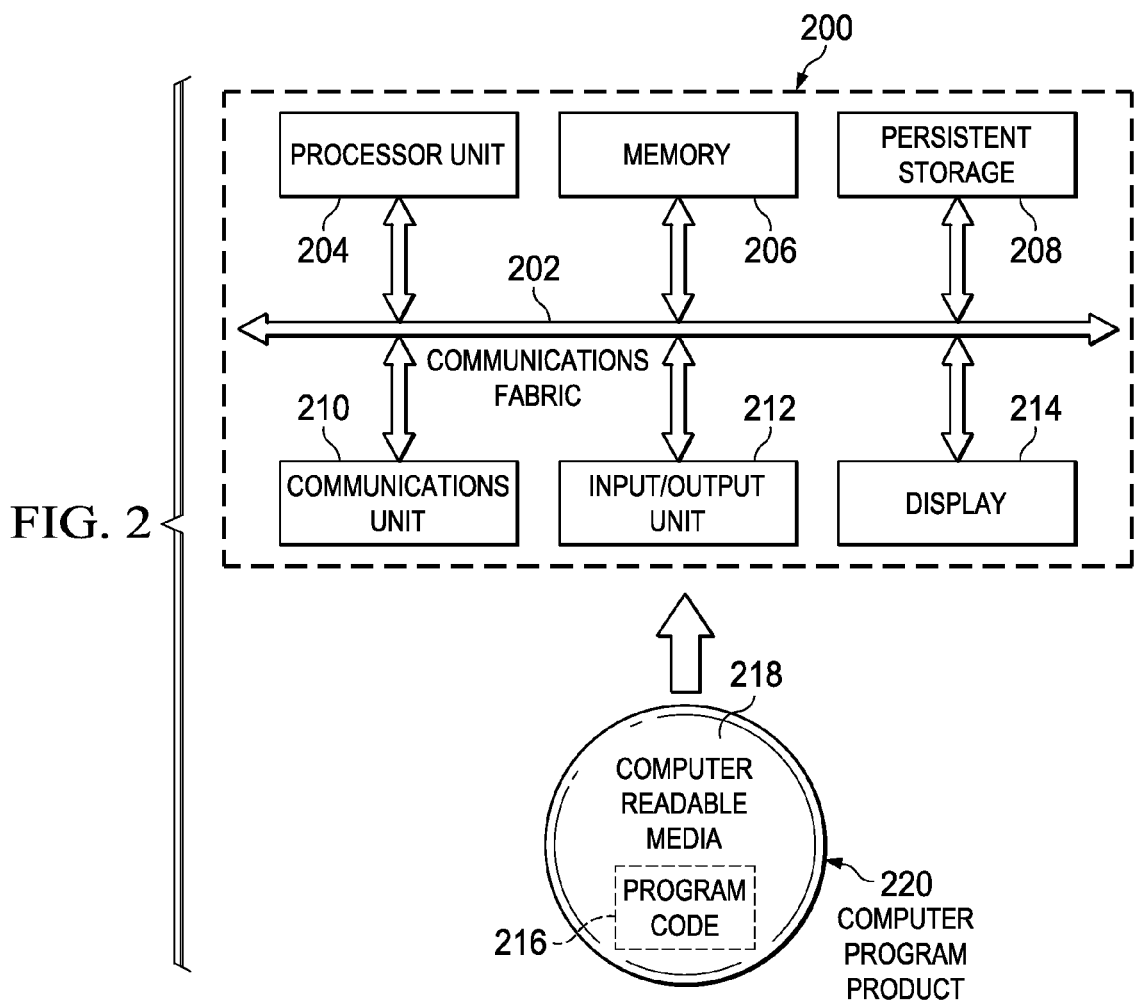
FIG. 2 is a block diagram of a data processing system in accordance with an illustrative embodiment.

With reference now to FIG. 2, a block diagram of a data processing system is depicted in accordance with an illustrative embodiment. Data processing system 200 is an example of one manner in which the network environment across back office 102 and agricultural vehicles 104, 106, and 108 in FIG. 1 may be implemented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

Figure 3:
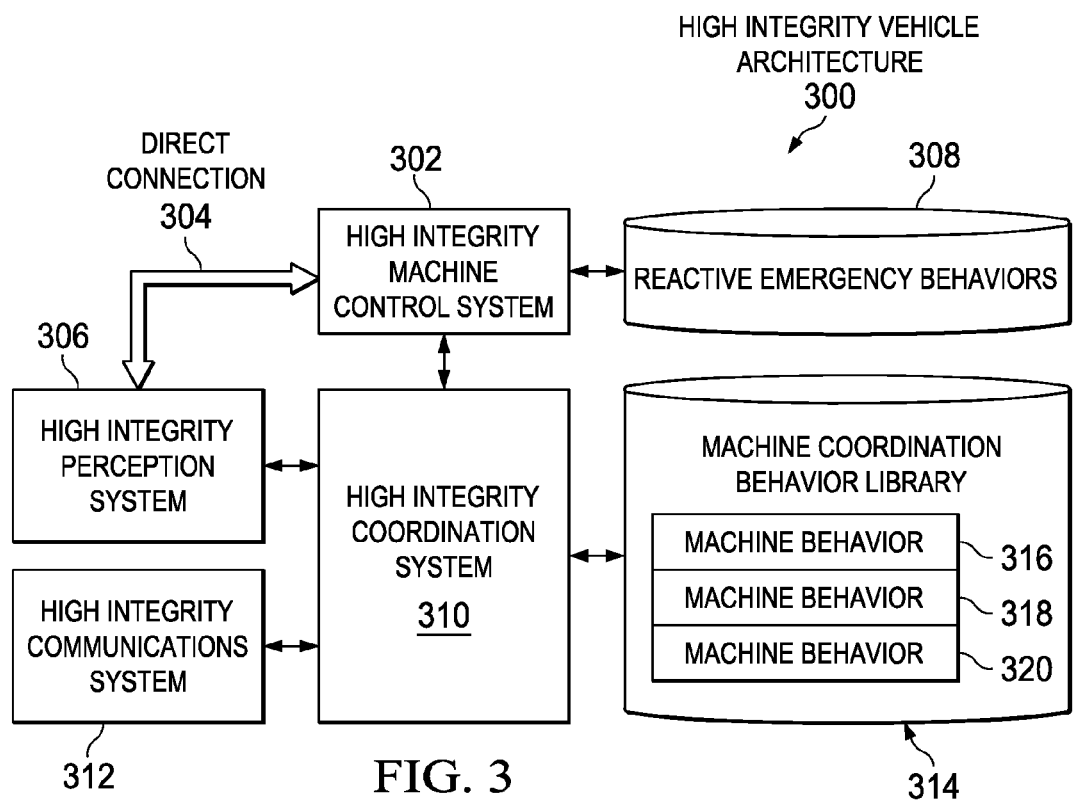
FIG. 3 is a block diagram of a vehicle coordination system in accordance with an illustrative embodiment.

With reference now to FIG. 3, a block diagram of a vehicle coordination system is depicted in accordance with an illustrative embodiment. In this example, high integrity vehicle architecture 300 is an example of a vehicle, such as agricultural vehicle 104, in FIG. 1. In this example, high integrity vehicle architecture 300 has high integrity components that increase the reliability of a vehicle. In this example, high integrity vehicle architecture 300 includes high integrity machine control system 302, high integrity perception system 306, reactive emergency behaviors 308, high integrity coordination system 310, high integrity communications system 312, and machine coordination behavior library 314.

High integrity machine control system 302 provides basic mobility functions, such as, for example, without limitation, steering, gear shifting, throttling, and braking, as well as a task, such as payload functions, which may include grain harvesting. High integrity machine control system 302 may include a number of redundant vehicle control components located on each vehicle in a worksite to provide high integrity machine control with fault tolerance. For example, redundant actuators controlling a braking system may provide for fault tolerance if one actuator malfunctions, enabling another actuator to maintain control of the braking system for the vehicle and providing high integrity to the vehicle control system. Different types of control components also may be present for controlling the same function on a vehicle. In one illustrative embodiment, at low speeds, steering can be accomplished by selectively locking wheels to implement skid steering. In another illustrative embodiment, vehicle speed can be reduced by shifting to a lower gear and letting the engine provide braking action.

High integrity machine control system 302 may have a direct connection 304 to high integrity perception system 306. Direct connection 304 allows high integrity machine control system 302 to implement select reactive emergency behaviors 308 in response to information received from high integrity perception system 306.

High integrity perception system 306 collects information about the environment around a vehicle using multiple redundant heterogeneous sensors. High integrity perception system 306 may have a direct connection 304 to high integrity machine control system 302. In this example, information collected by high integrity perception system 306 is sent to high integrity machine control system 302 to provide data in identifying how the vehicle should move in response to different environmental factors.

Reactive emergency behaviors 308 may include, for example, collision avoidance behaviors. Examples of collision avoidance behaviors may be behaviors, such as steering around an object or braking to avoid collision with an object.

High integrity coordination system 310 performs processing for machine coordination. The processing means may be physically co-existing with high integrity machine control system 302, or have separate processing resources. To provide high integrity, the processing means and resources of high integrity coordination system 310 are redundant in order to detect failures and provide fault tolerance. For example, high integrity coordination system 310 may have multiple processors in case one processor fails. The redundancy may include having different types of components for the same functions. For example, two different types of operating systems may be used to execute behaviors used to coordinate movement of the vehicle in case an error occurs in one of the operating systems.

High integrity coordination system 310 may share processing means with high integrity machine control system 302 or may have separate processing resources. The processing resources may be located locally in high integrity vehicle architecture 300, remotely in a back office, such as back office 102 in FIG. 1, or a combination in which some processing components are located in high integrity vehicle architecture 300 and some processing components are located remotely from high integrity vehicle architecture 300. In order to provide high integrity, the processing means used by high integrity coordination system 310 include redundant homogeneous or heterogeneous processing hardware and redundant heterogeneous and/or homogeneous processing software, in order to detect failures and remain fail-operational. High integrity coordination system 310 receives information from each of high integrity machine control system 302, high integrity perception system 306, reactive emergency behaviors 308, high integrity communications system 312, and machine coordination behavior library 314. High integrity coordination system 310 evaluates the information received by each of these systems in order to either initiate a new behavior or continue with the current behavior. Proposed new behaviors are compared across the redundant processing means and resources to determine the actual action to signal to high integrity vehicle architecture 300. A coordinated behavior is a machine behavior that involves at least one additional machine, results in a change of state for at least one of the machines, and cannot be accomplished by the machines acting independently of one another. There is at least one of a shared goal, shared future state, shared intention, shared plan, or a shared mission which may be shared a priori, be generated in situ, or be a combination of the two, such as an a prior plan which is updated based on in-situ conditions. A coordinated behavior for multiple vehicles may result in sequences or steps of more primitive behaviors being passed to high integrity machine control system 302 for execution and status reporting. For example, in an illustrative embodiment, a coordinated behavior of "harvest a field" may result in sequences of primitive behaviors such as, without limitation, "move to the edge of the field," "travel in a north-south direction," and "stop at the end of the field." These sequences or steps may be executed by high integrity machine control system 302.

High integrity communications system 312 contains multiple communications links and channels in order to provide redundancy for fail-safe communications. For example, high integrity communications system 312 may include AM radio frequency channels, FM radio frequency channels, cellular frequencies, global positioning system receivers, Bluetooth receivers, Wi-Fi channels, and Wi-Max channels.

Machine coordination behavior library 314 is accessed by processing means of high integrity coordination system 310. Machine coordination behavior library 314 contains machine behaviors 316, 318, and 320, which are specific to machine coordination. Other non-coordinating behaviors, such as path trajectory following and automatic cruise control, may be located elsewhere, such as in high integrity machine control system 302. There may be multiple copies of machine coordination behavior library 314 on each vehicle system, such as high integrity vehicle architecture 300.

Machine coordination behavior library 314 supports a wide range of types of coordination behaviors. For example, in an illustrative embodiment, machine behaviors 316, 318, and 320 may be coordination behaviors for tasks and sub-tasks or aspects of a task. Examples of tasks may include, without limitation, harvesting a field, performing a chemical spray of an outdoor area, driving a route, performing a collection routine, mowing a field or other ground area, traveling over terrain, detecting objects in an environment, detecting objects in sub-terrain, and the like.

In an illustrative embodiment, an example of sub-tasks or aspects for the task of harvesting a field may include, without limitation, specific behaviors such as making a number of passes of the field in a parallel manner to other vehicles performing the same task, maintaining a set distance from other vehicles performing the same task, harvesting the field in a north-south direction, harvesting the field in a east-west direction, making a head-turn at the top or bottom of the field, making a head-turn at the end of one pass to begin another pass of the field, executing a head-turn at the end of the field or a pass of the field in a specified degree of turn, such as 180 degrees, stopping at a pre-determined location to off-load the collected crop, applying the braking system at a specified location on the field in order to off-load the collected crop, altering the rate of propulsion in order to allow another vehicle, for example a grain collection vehicle, to come alongside the vehicle performing the task without causing either vehicle to come to a stop, and the like. The examples provided are one example of how the different illustrative embodiments may be implemented and are not meant to imply any physical or architectural limitations on the present invention.

In an illustrative embodiment, types of coordination behaviors may be organized hierarchically in machine coordination behavior library 314. For example, in an illustrative embodiment, a "harvest a field" top level behavior is decomposed into a set of simpler behaviors. In another illustrative embodiment, the "harvest a field" behavior is a task, and the set of simpler behaviors that relate to the task are sub-tasks or aspects of the task. Coordinating behaviors may be sub-tasks or aspects of a task or a top level behavior.

In an illustrative embodiment, coordinated behaviors, such as machine behaviors 316, 318, and 320 in machine coordination behavior library 314, may also include role behavior for multiple vehicles executing a task in an operating environment. For example, role behaviors may include "lead machine," "middle machine," and "final machine." In another example, role behaviors may include "leader," and "follower." Actions taken by coordinated vehicles will vary based on the role assigned to the individual vehicle, as well as internal and external sensor data processed by high integrity perception system 306.

The illustration of high integrity vehicle architecture 300 is not meant to imply physical or architectural limitations to different illustrative embodiments. Other embodiments may include other components in addition to or in place of the ones illustrated in FIG. 3. Also, the illustration of different functional components is not meant to limit the manner in which different functions may be implemented. For example, in some embodiments, high integrity vehicle architecture 300 may have high integrity coordination system 310 and high integrity machine control system 302 located in a single software and/or hardware component. In other examples, high integrity coordination system 310 may be located in a vehicle and/or in a remote location, such as a computer at a back office or other suitable location.

For example, high integrity coordination system 310 may be distributed between a number of vehicles and a remote location other than the number of vehicles. If high integrity coordination system 310 is located entirely or distributed between a remote location such as a back office computer and a number of vehicles, roles may be assigned by a back office computer, such as back office 102 in FIG. 1. The coordination of tasks performed after roles are assigned may be performed by high integrity coordination systems located at the vehicles. In other embodiments, the roles may be assigned by high integrity coordination systems located in a control or primary vehicle, such as high integrity vehicle architecture 300 in FIG. 3. In other examples, each individual vehicle may execute self-assignment behaviors. In an illustrative embodiment, each vehicle in a group of vehicles may initiate a self-assignment process during start-up of the vehicle based on the placement of the vehicle in relation to the other vehicles or in relation to the environment in which the task is to be performed.

In an illustrative embodiment, if agricultural vehicles 104, 106, and 108 in FIG. 1 are assigned the task of "harvest the field" and are equipped with self-assignment instructions, each of agricultural vehicles 104, 106, and 108 may assign their own role based on their respective locations and coordination behaviors. For example, if agricultural vehicle 104 is at the top of the field, agricultural vehicle 104 may assign itself the role of "leader" and communicate that using a communications unit, such as communications unit 412 in FIG. 4, to agricultural vehicles 106 and 108, each of which in turn will assign itself the role of "follower." In another illustrative embodiment, role behaviors may be stored in a separate library component of high integrity vehicle architecture 300.

Figure 4:
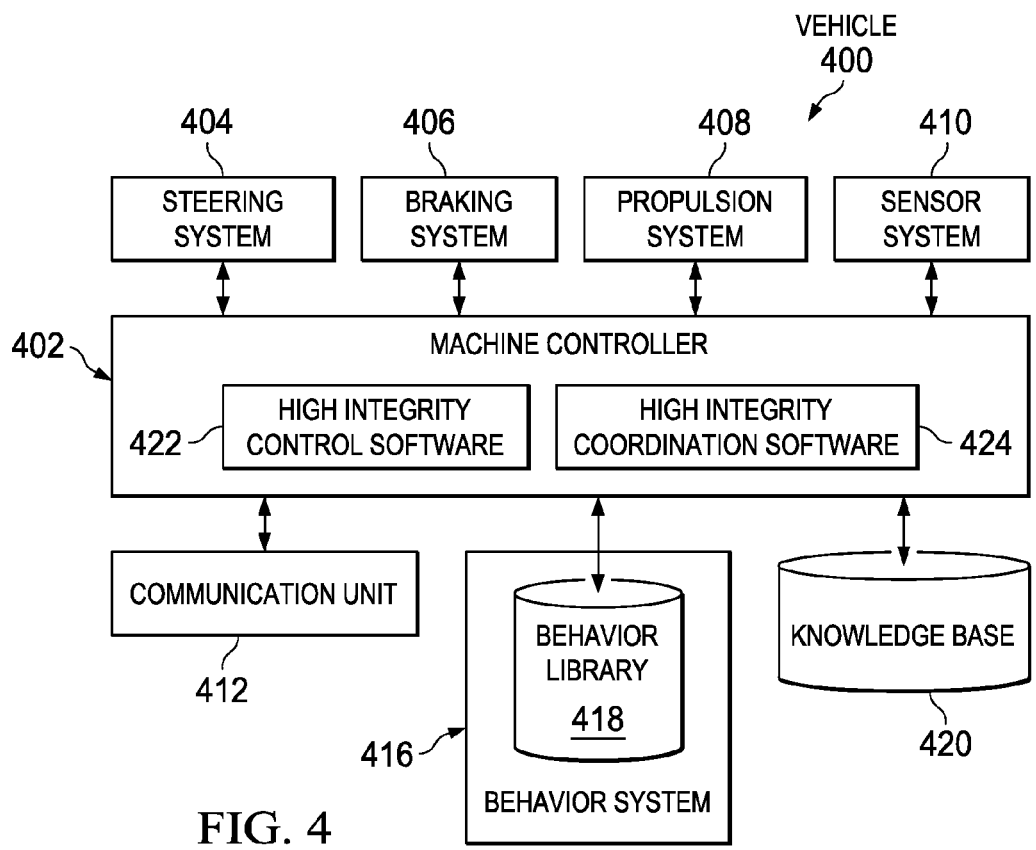
FIG. 4 is a block diagram of components used to control a vehicle in accordance with an illustrative embodiment.

With reference now to FIG. 4, a block diagram of components used to control a vehicle is depicted in accordance with an illustrative embodiment. In this example, vehicle 400 is an example of a vehicle, such as agricultural vehicle 104 in FIG. 1. Vehicle 400 is an example of one implementation of high integrity vehicle architecture 300 in FIG. 3. In this example, vehicle 400 includes machine controller 402, steering system 404, braking system 406, propulsion system 408, sensor system 410, communication unit 412, behavior system 416, behavior library 418, and knowledge base 420.

Machine controller 402 may be, for example, a data processing system, such as data processing system 200 in FIG. 2, or some other device that may execute processes to control movement of a vehicle. Machine controller 402 may be, for example, a computer, an application integrated specific circuit, and/or some other suitable device. Different types of devices and systems may be used to provide redundancy and fault tolerance. Machine controller 402 includes high integrity control software 422 and high integrity coordination software 424. Machine controller 402 may execute processes using high integrity control software 422 to control steering system 404, breaking system 406, and propulsion system 408 to control movement of the vehicle. Machine controller 402 may also use high integrity coordination software 424 to coordinate the movements of each vehicle receiving commands from machine controller 402. Machine controller 402 may send various commands to these components to operate the vehicle in different modes of operation. These commands may take various forms depending on the implementation. For example, the commands may be analog electrical signals in which a voltage and/or current change is used to control these systems. In other implementations, the commands may take the form of data sent to the systems to initiate the desired actions.

Steering system 404 may control the direction or steering of the vehicle in response to commands received from machine controller 402. Steering system 404 may be, for example, an electrically controlled hydraulic steering system, an electrically driven rack and pinion steering system, an Ackerman steering system, a skid-steer steering system, a differential steering system, or some other suitable steering system.

Braking system 406 may slow down and/or stop the vehicle in response to commands from machine controller 402. Braking system 406 may be an electrically controlled steering system. This steering system may be, for example, a hydraulic braking system, a friction braking system, or some other suitable braking system that may be electrically controlled.

In these examples, propulsion system 408 may propel or move the vehicle in response to commands from machine controller 402. Propulsion system 408 may maintain or increase the speed at which a vehicle moves in response to instructions received from machine controller 402. Propulsion system 408 may be an electrically controlled propulsion system. Propulsion system 408 may be, for example, an internal combustion engine, an internal combustion engine/electric hybrid system, an electric engine, or some other suitable propulsion system.

Sensor system 410 is a high integrity perception system and may be a set of sensors used to collect information about the environment around a vehicle. In these examples, the information is sent to machine controller 402 to provide data in identifying how the vehicle should move in different modes of operation. In these examples, a set refers to one or more items. A set of sensors is one or more sensors in these examples.

Communication unit 412 is a high integrity communications system and may provide multiple redundant communications links and channels to machine controller 402 to receive information. The communication links and channels may be heterogeneous and/or homogeneous redundant components that provide fail-safe communication. This information includes, for example, data, commands, and/or instructions. Communication unit 412 may take various forms. For example, communication unit 412 may include a wireless communications system, such as a cellular phone system, a Wi-Fi wireless system, a Bluetooth wireless system, and/or some other suitable wireless communications system. Further, communication unit 412 also may include a communications port, such as, for example, a universal serial bus port, a serial interface, a parallel port interface, a network interface, and/or some other suitable port to provide a physical communications link. Communication unit 412 may be used to communicate with a remote location or an operator.

Behavior system 416 contains behavior library 418, which in turn contains various behavioral processes specific to machine coordination that can be called and executed by machine controller 402. Behavior system 416 may be implemented in a remote location, such as back office 102 in FIG. 1, or in one or more vehicles. Behavior system 416 may be distributed throughout multiple vehicles, or reside locally on one control vehicle, such as high integrity vehicle architecture 300 in FIG. 3. In an illustrative embodiment, where behavior system 416 resides on one control vehicle, the control vehicle may distribute behavior libraries as needed to one or more other vehicles. In another illustrative embodiment, some components of behavior system 416 may be located in a control vehicle or in one or more vehicles, while other components of behavior system 416 may be located in a back office. For example, behavior library 418 may be located on a vehicle while other aspects of behavior system 416 are located in a back office, such as back office 102 in FIG. 1. In one illustrative embodiment, there may be multiple copies of behavior library 418 within behavior system 416 on vehicle 400 in order to provide redundancy.

Knowledge base 420 contains information about the operating environment, such as, for example, a fixed map showing streets, structures, tree locations, and other static object locations. Knowledge base 420 may also contain information, such as, without limitation, local flora and fauna of the operating environment, current weather for the operating environment, weather history for the operating environment, specific environmental features of the work area that affect the vehicle, and the like. The information in knowledge base 420 may be used to perform classification and plan actions. Knowledge base 420 may be located entirely in vehicle 400 or parts or all of knowledge base 420 may be located in a remote location that is accessed by machine controller 402.

Figure 5:
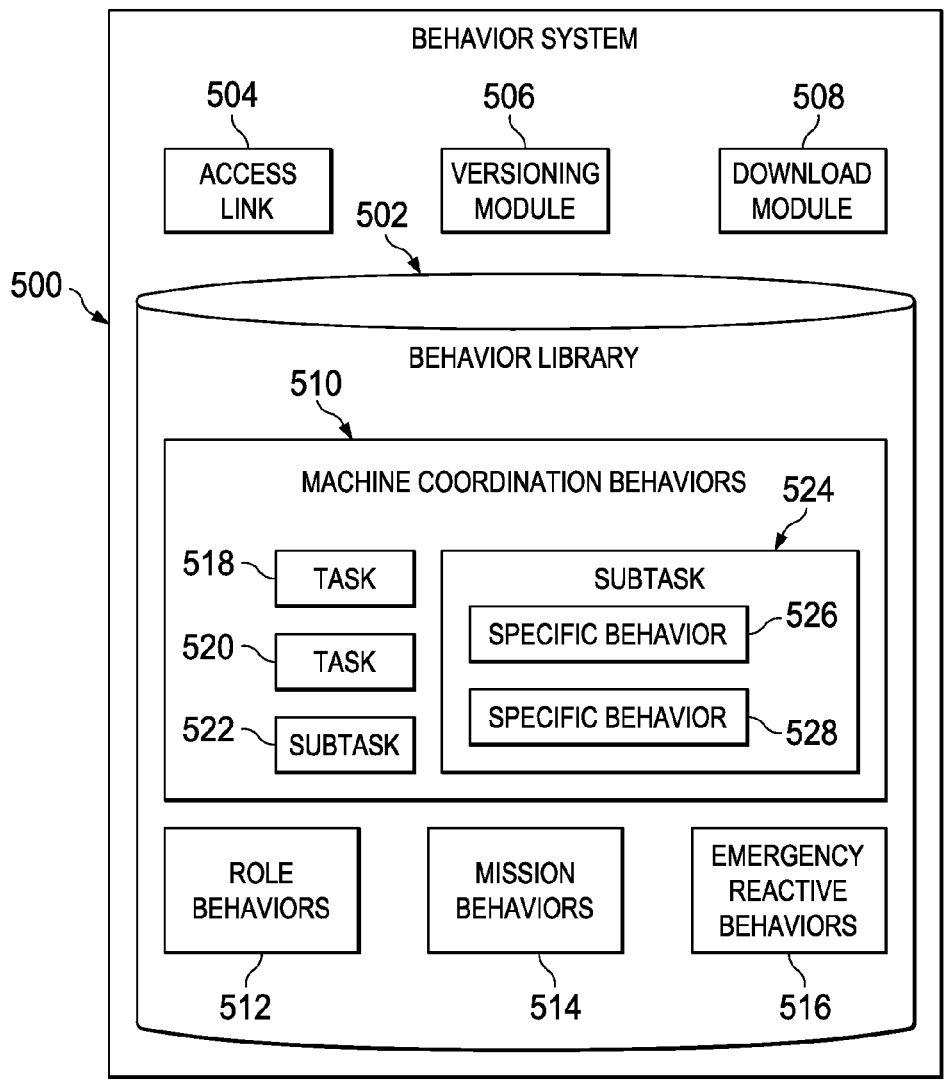
FIG. 5 is a block diagram of a behavior system in accordance with an illustrative embodiment.

With reference now to FIG. 5, a block diagram of a behavior system is depicted in accordance with an illustrative embodiment. Behavior system 500 is an example of a behavior system, such as behavior system 416 in vehicle 400 of FIG. 4.

Behavior system 500 includes behavior library 502, access link 504, versioning module 506, and download module 508.

Access link 504 allows for interaction between behavior system 500 and other systems of machine coordination, such as high integrity machine control system 302 and high integrity machine coordination system 310 in FIG. 3. In an illustrative embodiment, access link 504 may also control access to different systems on a vehicle to prevent unauthorized access or modification of vehicle systems. Access link 504 may control access using authentication features or encryption features, in one illustrative embodiment.

Versioning module 506 assigns unique version names or version numbers to each unique state of behavior library 502 and to each unique state of machine coordination behaviors 510, role behaviors 512, mission behaviors 514, and emergency reactive behaviors 516. This allows multiple machines in a network to compare library versions to ensure that each machine in a network is running the correct version of behaviors for a task or sub-tasks assigned.

Download module 508 provides for updates of each of the different components of behavior library 502 through a control system or back office, such as back office 102 in FIG. 1.

Behavior library 502 includes machine coordination behaviors 510, role behaviors 512, mission behaviors 514, and emergency reactive behaviors 516. Multiple copies of behavior library 502 may exist on each machine in a network, such as agricultural vehicles 104, 106, and 108, in network 100 of FIG. 1, in order to provide redundancy.

In one illustrative embodiment, machine coordination behaviors 510 is an example of machine coordination behavior library 314 in FIG. 3. Machine coordination behaviors 510 include task 518, task 520, subtask 522, and subtask 524. Task 518 and task 520 are examples of machine behaviors specific to machine coordination. Other non-coordinating behaviors, such as path trajectory following and automatic cruise control, may be located elsewhere, such as in mission behaviors 514. There may be multiple copies of machine coordination behaviors 510 on each machine, such as agricultural vehicles 104, 106, and 108 in FIG. 1.

Machine coordination behaviors 510 supports a wide range of types of coordination behaviors. In an illustrative embodiment, types of coordination behaviors may be organized hierarchically in machine coordination behaviors 510. For example, in an illustrative embodiment, task 518 may be a "harvest a field" top level behavior that is decomposed into a set of simpler behaviors. In another illustrative embodiment, task 518 is the "harvest a field" behavior, and subtask 522 is the set of simpler behaviors that relate to the task, also referred to as aspects of the task. In yet another illustrative embodiment, task 520 may be a "mow a field" top level behavior. Subtask 524 may be an aspect of the "mow the field" behavior that includes specific behavior 526 and specific behavior 528. Specific behavior 526 may be "mow a field in a north-to-south direction," while specific behavior 528 may be "mow a field in parallel passes." These examples are not meant to imply physical or architectural limitations, and are only provided as an illustrative embodiment of the advantageous invention.

Coordinated behaviors in machine coordination behaviors 510, such as task 518 and task 520, may correspond to role behaviors 512 for multiple vehicles executing a task in an operating environment. For example, role behaviors 512 may include "lead machine," "middle machine," and "final machine." Actions taken by coordinated vehicles will vary based on the role assigned to the individual vehicle, as well as emergency reactive behaviors 516 triggered by sensor data received from the vehicle sensor system, such as sensor system 410 in FIG. 4.

Mission behaviors 514 may contain both general and specific mission behaviors for a vehicle. In an illustrative embodiment, general mission behaviors may be a top level behavior or task, such as "harvest a field." The details of the "harvest a field" mission may be worked out on-site between coordinating vehicles through a high integrity coordination system, such as high integrity coordination system 310 in FIG. 3.

In another illustrative embodiment, specific mission behaviors may be a top level behavior or task including a detailed plan on how the behavior or task is to be executed. The detailed plan on how the behavior or task it to be executed is broken down into sub-tasks or aspects of the task. For example, the task may be "harvest a field" and may include a detailed plan for each machine executing the "harvest a field" task. In yet another illustrative embodiment, mission behaviors 514 may include a general task with associated sub-tasks or aspects of the task.

For example, the task may be "harvest a field" and the sub-tasks or aspects of the task may include "power up the vehicle," "execute a follow the leader mode," "harvest in a parallel manner," "avoid obstacles while harvesting," "coordinate with combine vehicle to unload grain while harvesting," "make a headland turn," and "harvest the field in a north-to-south direction starting on the west end of the field with multiple vehicles making adjacent, parallel passes of the field." The illustrative embodiments are not meant to limit the architecture of the present invention in any way. The intent is for mission behaviors 514 to support a broad range of mission and path planning methods.

In one illustrative embodiment, emergency reactive behaviors 516 is an example of reactive emergency behaviors 308 in FIG. 3. Emergency reactive behaviors 516 may include, for example, collision avoidance behaviors. Examples of collision avoidance behaviors may be behaviors, such as steering around an object or braking to avoid collision with an object. Emergency reactive behaviors 516 is employed after an object or obstacle is detected by the sensor system of a vehicle, such as sensor system 410 in FIG. 4, or high integrity perception system 306 in FIG. 3.

Figure 6:
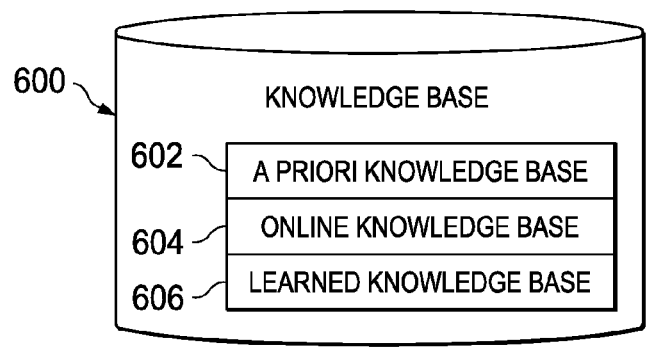
FIG. 6 is a block diagram of a knowledge base in accordance with an illustrative embodiment.

With reference now to FIG. 6, a block diagram of a knowledge base is depicted in accordance with an illustrative embodiment. Knowledge base 600 is an example of a knowledge base component of a machine controller, such as knowledge base 420 of vehicle 400 in FIG. 4. For example, knowledge base 600 may be, without limitation, a component of a navigation system, an autonomous machine controller, a semi-autonomous machine controller, or may be used to make management decisions regarding work-site activities and coordination activities. Knowledge base 600 includes a priori knowledge base 602, online knowledge base 604, and learned knowledge base 606.

A priori knowledge base 602 contains static information about the operating environment of a vehicle. Types of information about the operating environment of a vehicle may include, without limitation, a fixed map showing streets, structures, trees, and other static objects in the environment; stored geographic information about the operating environment; and weather patterns for specific times of the year associated with the operating environment.

A priori knowledge base 602 may also contain fixed information about objects that may be identified in an operating environment, which may be used to classify identified objects in the environment. This fixed information may include attributes of classified objects, for example, an identified object with attributes of tall, narrow, vertical, and cylindrical, may be associated with the classification of "telephone pole."

A priori knowledge base 602 may further contain fixed work-site information. A priori knowledge base 602 may be updated based on information from online knowledge base 604, and learned knowledge base 606.

Online knowledge base 604 may be accessed with a communications unit, such as communications unit 412 in FIG. 4, to wirelessly access the Internet. Online knowledge base 604 dynamically provides information to a machine control process which enables adjustment to sensor data processing, site-specific sensor accuracy calculations, and/or exclusion of sensor information. For example, online knowledge base 604 may include current weather conditions of the operating environment from an online source. In some examples, online knowledge base 604 may be a remotely accessed knowledge base. This weather information may be used by machine controller 402 in FIG. 4 to determine which sensors to activate in order to acquire accurate environmental data for the operating environment. Weather, such as rain, snow, fog, and frost may limit the range of certain sensors, and require an adjustment in attributes of other sensors in order to acquire accurate environmental data from the operating environment. Other types of information that may be obtained include, without limitation, vegetation information, such as foliage deployment, leaf drop status, and lawn moisture stress, and construction activity, which may result in landmarks in certain regions being ignored.

Learned knowledge base 606 may be a separate component of knowledge base 600, or alternatively may be integrated with a priori knowledge base 602 in an illustrative embodiment. Learned knowledge base 606 contains knowledge learned as the vehicle spends more time in a specific work area, and may change temporarily or long-term depending upon interactions with online knowledge base 604 and user input. For example, learned knowledge base 606 may detect the absence of a tree that was present the last time it received environmental data from the work area. Learned knowledge base 606 may temporarily change the environmental data associated with the work area to reflect the new absence of a tree, which may later be permanently changed upon user input confirming the tree was in fact cut down. Learned knowledge base 606 may learn through supervised or unsupervised learning.

Figure 7:
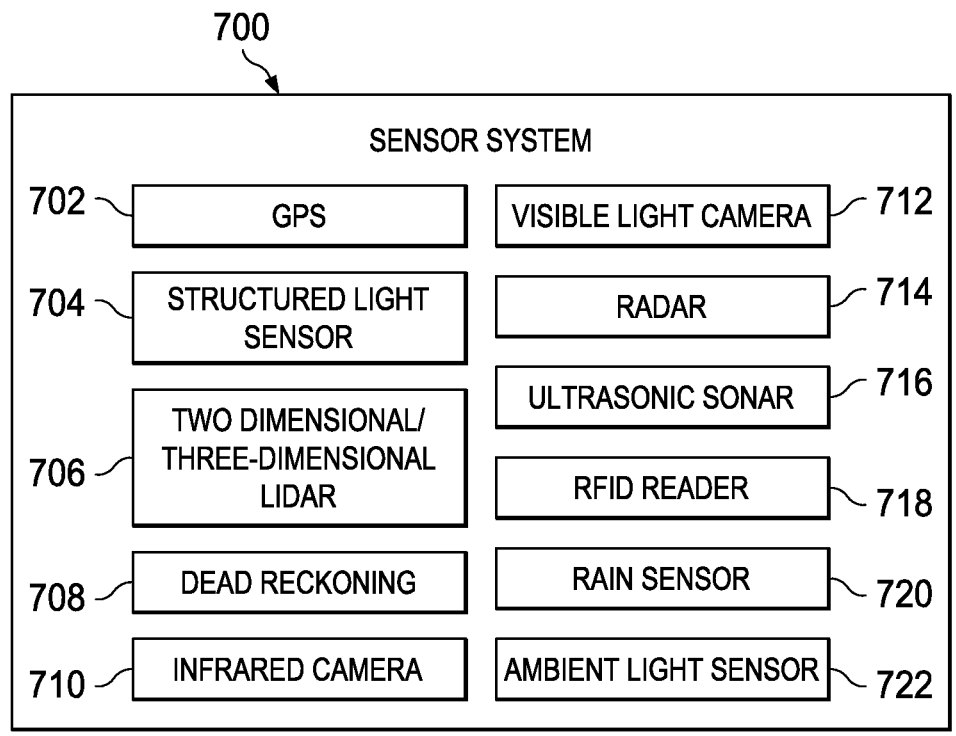
FIG. 7 is a block diagram of a sensor system in accordance with an illustrative embodiment.

With reference now to FIG. 7, a block diagram of a sensor system is depicted in accordance with an illustrative embodiment. Sensor system 700 is an example of one implementation of sensor system 410 in FIG. 4. Sensor system 700 is also an example of one implementation of high integrity perception system 306 in FIG. 3. Sensor system 700 may provide information for safeguarding, relative positioning, and/or global positioning. For example, in an illustrative embodiment, if a worker, such as worker 112 in FIG. 1, is operating in a worksite, such as field 110, alongside vehicles, such as agricultural vehicles 104, 106, and 108, sensor system 700 may provide information about the position of each of agricultural vehicles 104, 106, and 108 in relation to each other, as well as the location of worker 112 in relation to each of agricultural vehicles 104, 106, and 108. This information allows for safeguarding of worker 112 as well as each of agricultural vehicles 104, 106, and 108 as they operate together on field 110. This information also provides relative positioning of each vehicle operating in a worksite for use in vehicle coordination.

As illustrated, sensor system 700 includes, for example, global positioning system 702, structured light sensor 704, two dimensional/three dimensional lidar 706, dead reckoning 708, infrared camera 710, visible light camera 712, radar 714, ultrasonic sonar 716, radio frequency identification reader 718, rain sensor 720, and ambient light sensor 722. These different sensors may be used to identify the environment around a vehicle. The sensors in sensor system 700 may be selected such that one of the sensors is always capable of sensing information needed to operate the vehicle in different operating environments.

Global positioning system 702 may identify the location of the vehicle with respect to other objects in the environment. Global positioning system 702 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionospheric conditions, satellite constellation, and signal attenuation from vegetation.

Structured light sensor 704 emits light in a pattern, such as one or more lines, reads back the reflections of light through a camera, and interprets the reflections to detect and measure objects in the environment. Two dimensional/three dimensional lidar 706 is an optical remote sensing technology that measures properties of scattered light to find range and/or other information of a distant target. Two dimensional/three dimensional lidar 706 emits laser pulses as a beam, than scans the beam to generate two dimensional or three dimensional range matrices. The range matrices are used to determine distance to an object or surface by measuring the time delay between transmission of a pulse and detection of the reflected signal.

Dead reckoning 708 begins with a known position, which is then advanced, mathematically or directly, based upon known speed, elapsed time, and course. The advancement based upon speed may use the vehicle odometer, or ground speed radar, to determine distance traveled from the known position. Infrared camera 710 detects heat indicative of a living thing versus an inanimate object. An infrared camera may also form an image using infrared radiation. Visible light camera 712 may be a standard still-image camera, which may be used alone for color information or with a second camera to generate stereoscopic, or three-dimensional, images. When visible light camera 712 is used along with a second camera to generate stereoscopic images, the two or more cameras may be set with different exposure settings to provide improved performance over a range of lighting conditions. Visible light camera 712 may also be a video camera that captures and records moving images.

Radar 714 uses electromagnetic waves to identify the range, altitude, direction, or speed of both moving and fixed objects. Radar 714 is well known in the art, and may be used in a time of flight mode to calculate distance to an object, as well as Doppler mode to calculate the speed of an object. Ultrasonic sonar 716 uses sound propagation on an ultrasonic frequency to measure the distance to an object by measuring the time from transmission of a pulse to reception and converting the measurement into a range using the known speed of sound. Ultrasonic sonar 716 is well known in the art and can also be used in a time of flight mode or Doppler mode, similar to radar 714. Radio frequency identification reader 718 relies on stored data and remotely retrieves the data using devices called radio frequency identification (RFID) tags or transponders.

Rain sensor 720 detects precipitation on an exterior surface of the vehicle. In one embodiment, rain sensor 720 includes an infrared beam and an infrared sensor. In this illustrative example, rain sensor 720 operates by beaming an infrared light at a 45-degree angle into the windshield of the vehicle from the inside of the vehicle. If the windshield is wet, less light makes it back to the sensor, indicating the presence of moisture on the windshield and the likelihood of rain. The illustrative embodiment is not meant to limit the architecture of rain sensor 720. Other rain detection technologies may be used without departing from the spirit and scope of the invention. Ambient light sensor 722 measures the amount of ambient light in the operating environment.

Sensor system 700 may retrieve environmental data from one or more of the sensors to obtain different perspectives of the environment. For example, sensor system 700 may obtain visual data from visible light camera 712, data about the distance of the vehicle in relation to objects in the environment from two dimensional/three dimensional lidar 706, and location data of the vehicle in relation to a map from global positioning system 702.

Sensor system 700 is capable of detecting objects even in different operating environments. For example, global positioning system 702 may be used to identify a position of the vehicle. If the street has trees with thick canopies during the spring, global positioning system 702 may be unable to provide accurate location information. In some cases, conditions may cause the location information provided by global positioning system 702 to be less accurate than desired. For example, in a condition with a heavy canopy, the signal from a satellite to a global positioning system receiver is attenuated and more prone to multipath. Multipath results when a signal between a GPS satellite and a receiver follows multiple paths, typically caused by reflection from objects in the environment. These multiple signals can interfere with one another and the result may be phase shifting or destructive interference of the combined received signal. The signal corruption may result in a significant reduction in GPS position accuracy. In this situation, visible light camera 712 and/or two dimensional/three dimensional lidar 706 may be used to identify a location of the vehicle relative to non-mobile objects, such as curbs, light poles, trees, and other suitable landmarks.

In addition to receiving different perspectives of the environment, sensor system 700 provides redundancy in the event of a sensor failure, which facilitates high-integrity operation of the vehicle. For example, in an illustrative embodiment, if visible light camera 712 is the primary sensor used to identify the location of the operator in side-following mode, and visible light camera 712 fails, radio frequency identification reader 718 will still detect the location of the operator through a radio frequency identification tag worn by the operator, thereby providing redundancy for safe operation of the vehicle.

Figure 8:
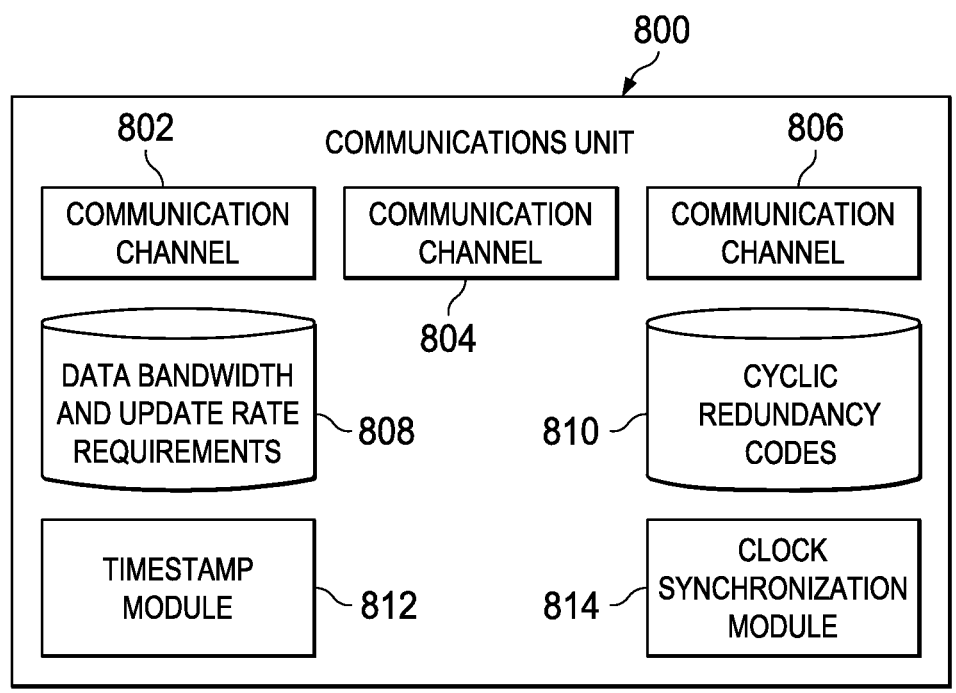
FIG. 8 is a block diagram of a communications unit in accordance with an illustrative embodiment.

With reference now to FIG. 8, a block diagram of a communications unit is depicted in accordance with an illustrative embodiment. Communications unit 800 is an example of one embodiment of communications unit 412 in FIG. 4. Communications unit 800 is also an example of one embodiment of high integrity communications system 312 in FIG. 3.

Communications unit 800 includes communication channel 802, communication channel 804, communication channel 806, data bandwidth and update rate requirements 808, cyclic redundancy codes 810, timestamp module 812, and clock synchronization module 814. Communication channels 802, 804, and 806 are illustrative embodiments of heterogeneous channels across multiple frequencies. Communications unit 800 may include multiple copies of each of communication channels 802, 804, and 806 to provide redundant homogeneous channels. In an illustrative embodiment, examples of communication channels 802, 804, and 808 may include, without limitation, AM radio frequency channels, FM radio frequency channels, cellular frequencies, satellite frequency channels, Bluetooth receivers, Wi-Fi channels, and Wi-Max channels.

Data bandwidth and update rate requirements 808 contains information regarding the different communication bandwidths available to a particular vehicle, such as agricultural vehicle 104 in FIG. 1, and the corresponding update rate for each of the different bandwidths. In an illustrative embodiment, for a particular coordinated behavior, certain pieces of information may need to be sent at a particular update rate when the vehicles are operating at a given speed. If the available bandwidth does not support the desired behavior and its data transfer needs, the behavior may be denied or the coordinated behavior may require execution at a slower speed so vehicle control can be maintained with the available lower update rate.

Cyclic redundancy codes 810 is a data error checking means that receives as input a data stream of any length, and produces as output a value of a certain space, commonly a 32-bit integer. A cyclic redundancy code can be used as a checksum to detect alteration of data during transmission or storage. Cyclic redundancy codes are particularly good at detecting common errors caused by noise in transmission channels.

Timestamp module 812 assigns a timestamp to data sets to ensure freshness for the applications which use the data for coordination. In one illustrative embodiment, the timestamp of the current stored data is compared to the timestamp of newly arrived data. The current data is only overwritten if the time stamp of the newly arrived data is more recent than the time stamp of the currently stored data. This is especially important if a store-and-forward network is used on a worksite and data may be delayed in traveling between vehicle A and vehicle B.

Clock synchronization module 814 ensures that the computing means in each of the multiple controllable vehicles are synchronized with a common timing reference. Even when initially set accurately, real clocks will differ after some amount of time due to clock drift, caused by clocks counting time at slightly different rates. There are several methods of clock synchronization that are well known in the art.

Figure 9:
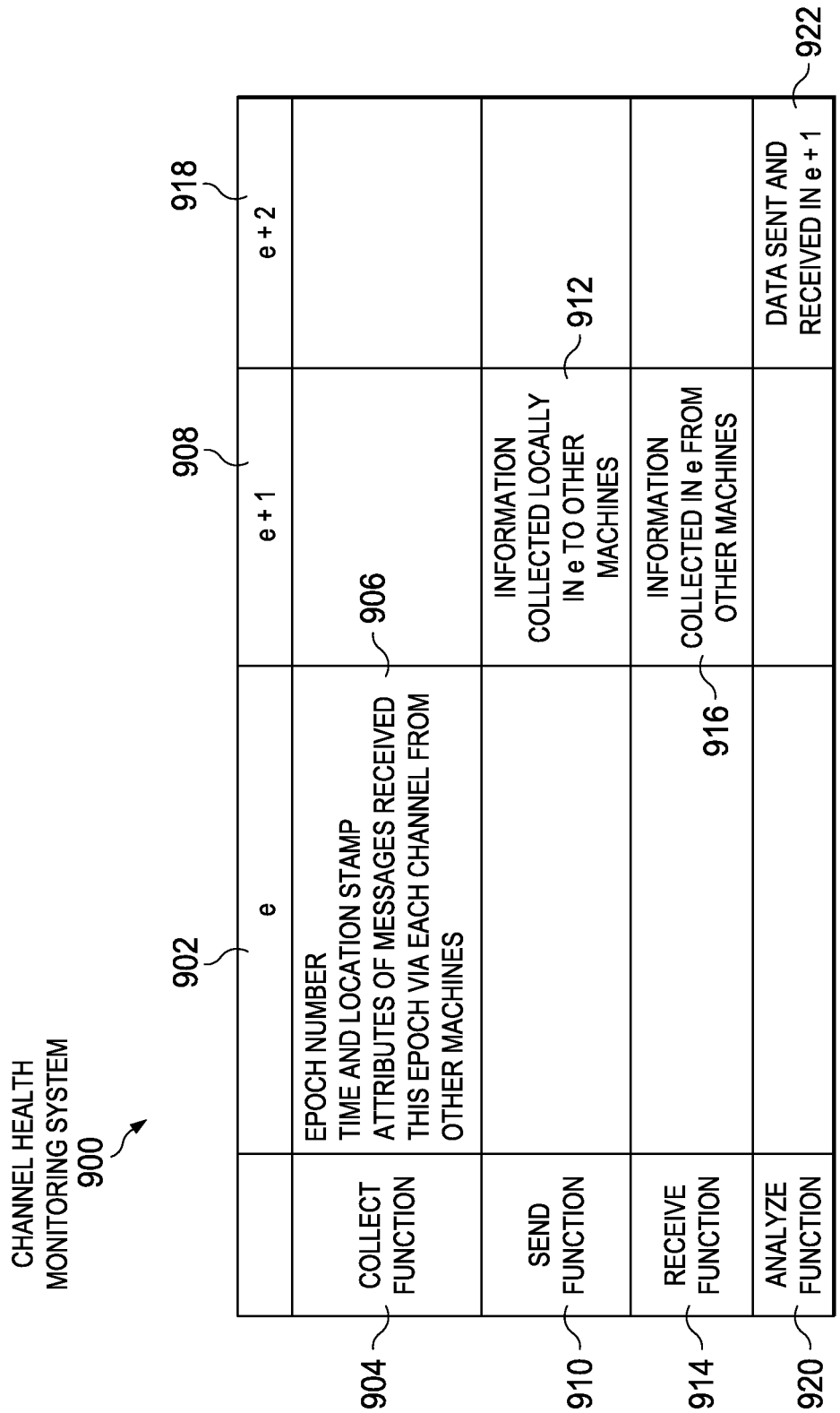
FIG. 9 is a block diagram of different states of a high integrity data communications system channel health monitoring system.

With reference now to FIG. 9, a block diagram of different states of a high integrity data communications system channel health monitoring system is depicted in accordance with an illustrative embodiment. Channel health monitoring system 900 is an example of a process implemented by high integrity communications system 312 in FIG. 3.

In an illustrative embodiment, an epoch is defined as the 100 ms data sharing period in a 10 Hz update rate coordination system. During epoch 902, each machine or vehicle in the network, such as network 100 in FIG. 1, performs collect function 904. During epoch 902, collect function 904 operates to collect local information, such as the epoch number, time and location stamp, and attributes of messages received during epoch 902 from each of the other machines or vehicles in the network, as shown in block 906. In one illustrative embodiment, attributes of messages received during epoch 902 may include, without limitation, message size, message errors, and received signal strength.

During the next epoch, epoch+1 908, each vehicle or machine in the network performs send function 910. During epoch+1 908, send function 910 operates to transmit the summary data collected locally during epoch 902 to each of the other vehicles or machines in the network, as shown in block 912. During the same epoch+1 908, each vehicle or machine in the network also performs receive function 914. Receive function 914 operates to receive the information collected during epoch 902 from each of the other vehicles or machines in the network, as shown in block 916. For example, in an illustrative embodiment, each of agricultural vehicles 104, 106, and 108 in FIG. 1 performs collect function 904 during epoch 902 to collect data locally. During epoch+1 908, each of agricultural vehicles 104, 106, and 108 performs both send function 910 to transmit the data collected locally to each of the other agricultural vehicles in the network, and receive function 914 to receive the information collected by each of the other agricultural vehicles in the network.

During the next epoch, epoch+2 918, each vehicle or machine in the network performs analyze function 920. Analyze function 920 operates to analyze the fleet data from epoch 902, which was received by each vehicle of machine during epoch+1 908, as shown in block 922. If all vehicles or machines in the network participated, and no errors were detected, the communications system is fine. If nothing was heard from a machine, it is either having systemic problems or has left the area. Preferably, a machine that is leaving the area or powering down will communicate that action to the other machines in the network prior to taking the action. If a machine performed send function 910, but the data collected locally was not received by the other machines, then that channel on the machine that was not heard may have a channel component failure.

If all vehicles or machines in the network used a common channel, but no data was received during receive function 914, or the data received was corrupted, there may be an environmental issue with the channel. Positioning data from each machine, using a sensor system, such as sensor system 700 in FIG. 7, may help determine if the environmental problem is local or work-site wide.

If at least two or three channels with high bandwidth are still available with good data transmission characteristics, work can continue with the failed components or channels. In an illustrative embodiment, if only lower bandwidth channels are available, the epoch duration may need to be increased, machine speed decreased, and following distance increased, for example. Additionally, lower bandwidth in the machine network may require some behaviors with high bandwidth requirements to be eliminated or replaced by a sequence of lower bandwidth coordinated behaviors.

Figure 10:
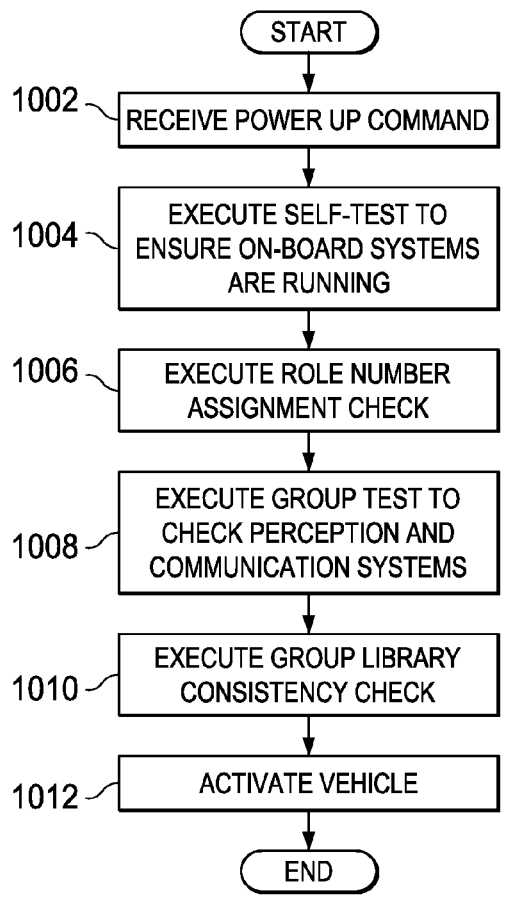
FIG. 10 is a flowchart illustrating a process for activating a vehicle in accordance with an illustrative embodiment.

With reference now to FIG. 10, a flowchart illustrating a process for activating a vehicle is depicted in accordance with an illustrative embodiment. The process in FIG. 10 may be implemented by software, such as machine controller 402 in FIG. 4.

The process begins by receiving a power up command (step 1002). The process executes a self-test to ensure on-board systems are running (step 1004). On-board systems include communication systems, such as high integrity communication system 312 in FIG. 3, coordination systems, such as high integrity coordination system 310 in FIG. 3, control systems, such as high integrity machine control system 302 in FIG. 3, sensor systems, such as high integrity perception system 306 in FIG. 3, as well as steering, braking, and propulsion systems, such as steering system 404, braking system 406, and propulsion system 408 in FIG. 4.

Next, the process executes a role number assignment check (step 1006). In one illustrative embodiment, role number assignment may be a role assignment, such as "lead," "middle," or "final." In another illustrative embodiment, role number assignment may be expressed as "first," "second," and "third," or as "leader" and "follower." The process then executes a group test to check perception and communications systems (step 1008) of each of the multiple controllable vehicles in a network environment. The process executes a group library consistency check (step 1010) to ensure that each of the multiple controllable machines are operating with the same library versions, and then the process activates the vehicle (step 1012), with the process terminating thereafter.

Figure 11:
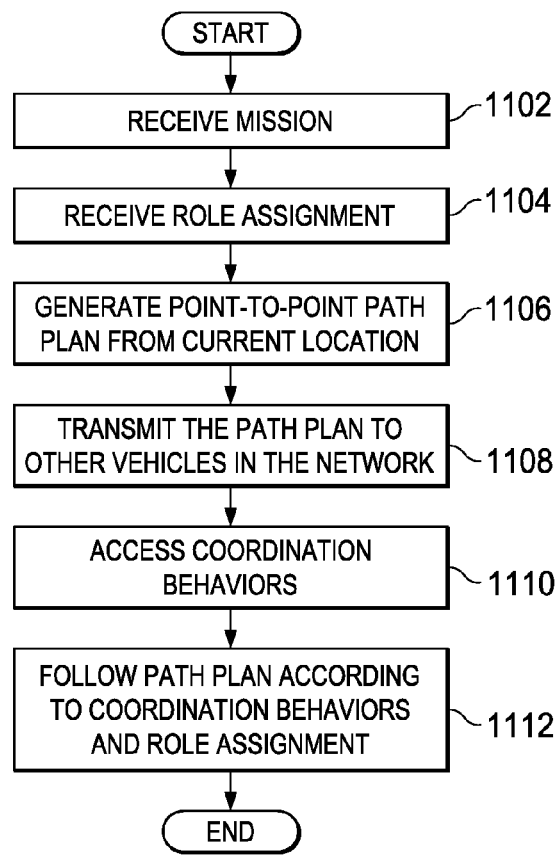
FIG. 11 is a flowchart illustrating a process for executing a task in accordance with an illustrative embodiment.

With reference now to FIG. 11, a flowchart illustrating a process for executing a task is depicted in accordance with an illustrative embodiment. The process in FIG. 11 may be implemented by software, such as machine controller 402 in FIG. 4.

The process begins by receiving a mission (step 1102). A mission may be a top level behavior or task. Next, the process receives a role assignment (step 1104) for the mission or task assigned. The process generates a point-to-point path plan starting from the current location (step 1106). The process may terminate after step 1106 or optionally, may move to step 1108. The process optionally transmits the path plan to other vehicles in the network (step 1108) and accesses coordination behaviors (step 1110). The process then follows the path plan according to the coordination behaviors and role assignment (step 1112) associated with the mission or task, with the process terminating thereafter.

Figure 12:
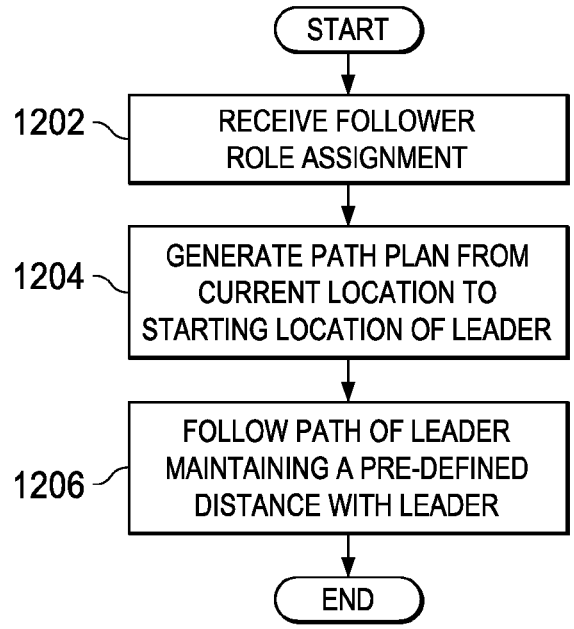
FIG. 12 is a flowchart illustrating a process for executing a task in a follower role in accordance with an illustrative embodiment.

With reference now to FIG. 12, a flowchart illustrating a process for executing a task in a follower role is depicted in accordance with an illustrative embodiment. The process in FIG. 12 may be implemented by software, such as machine controller 402 in FIG. 4.

The process begins by receiving a follower role assignment (step 1202). The follower role assignment may be, for example, without limitation, in the form of a "middle" role, a "final" role, a "second" role, or a "third" role. For example, in an illustrative embodiment, a "final" role may indicate that the vehicle is positioned as the last vehicle in a group of vehicles executing a task. In another illustrative embodiment, a "third" role may indicate that the vehicle is positioned as the third vehicle in a group of vehicles executing a task. The role may be indicative of, for example, without limitation, the position of a vehicle in relation to other vehicles in a group of vehicles, the position of a vehicle in relation to the operating environment, the order in which the vehicle executes an aspect of the task, or the timing of a vehicle executing an aspect of the task. Next, the process generates a path plan from the current location to the starting location of the leader (step 1204), accessing coordination behaviors to determine the appropriate coordination behavior for the follower role in the particular task assigned. The process then follows the path of the leader maintaining a pre-defined distance with the leader (step 1206) according to the relevant coordination behaviors, with the process terminating thereafter.

Figure 13:
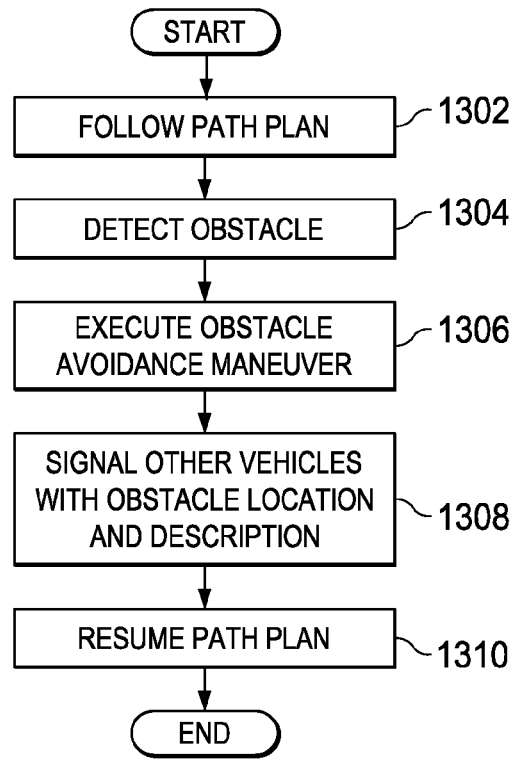
FIG. 13 is a flowchart illustrating a process for obstacle avoidance in accordance with an illustrative embodiment.

With reference now to FIG. 13, a flowchart illustrating a process for obstacle avoidance is depicted in accordance with an illustrative embodiment. The process in FIG. 13 may be implemented by software, such as machine controller 402 in FIG. 4.

The process begins by following a path plan (step 1302). The process detects an obstacle (step 1304) and executes obstacle avoidance maneuvers (step 1306). Obstacle avoidance maneuvers may be retrieved from a behavior library, such as reactive emergency behaviors 308 in FIG. 3. Next, the process signals other vehicles in the network with the obstacle location and description (step 1308). The process then resumes the path plan (step 1310), with the process terminating thereafter.

Figure 14:
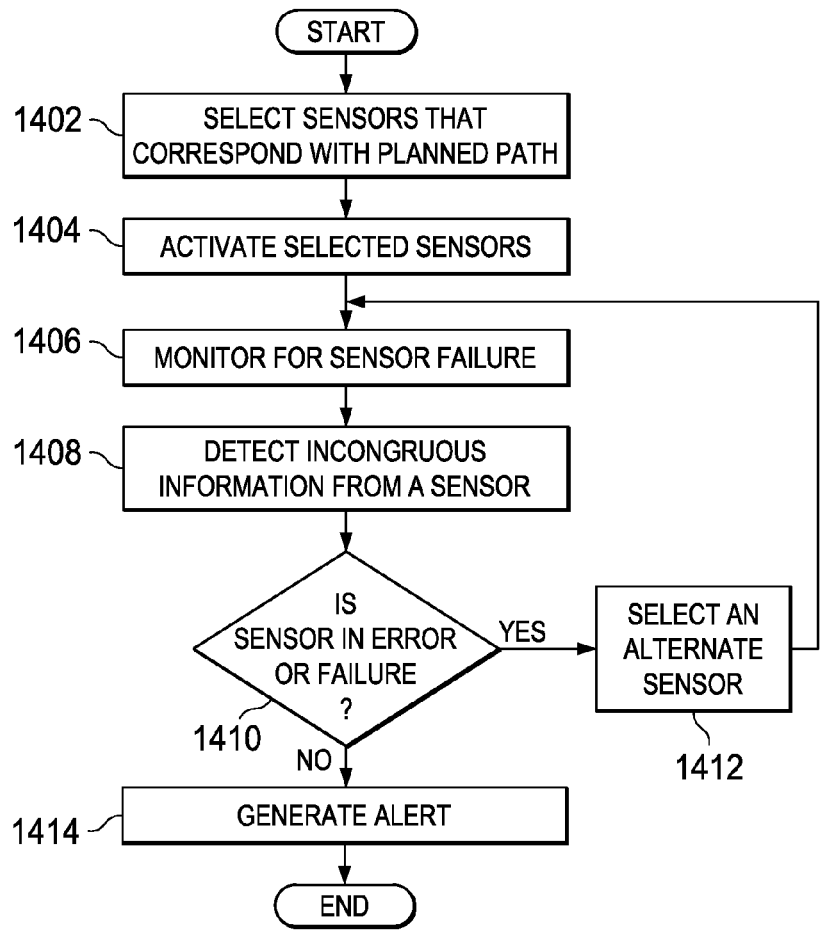
FIG. 14 is a flowchart illustrating a process for monitoring sensor integrity in accordance with an illustrative embodiment.

With reference now to FIG. 14, a flowchart illustrating a process for monitoring sensor integrity is depicted in accordance with an illustrative embodiment. This process may be implemented by machine controller 402 in FIG. 4.

The process begins by selecting sensors that correspond with the planned path (step 1402). For example, a planned path of an agricultural field may correspond with a visible camera sensor. Next, the process activates the selected sensors (step 1404) and monitors for sensor failure (step 1406). When the process detects incongruous information from a sensor (step 1408), the process determines whether the sensor is in error or failure (step 1410). Incongruous information may be information about an object detected that is incongruous with previous information about an object, or information about an operating environment that is incongruous with previous information about the operating environment. Incongruous information may be, for example, an indication of the absence of an object that was once present or a change in attributes of an object that has been present and previously identified. For example, when one or more sensors detect the presence of an object, but one sensor fails to detect the presence of the object, incongruous sensor information may be provided about whether or not the object exists in the operating environment. The sensor that fails to detect the presence of the object may have experienced a detection error or may have failed completely. If the sensor is in error or failure, the process selects an alternate sensor (step 1412), and continues to monitor for sensor failure (step 1406). If the sensor is not in error or failure, the process generates an alert (step 1414), with the process terminating thereafter.

Figure 15:
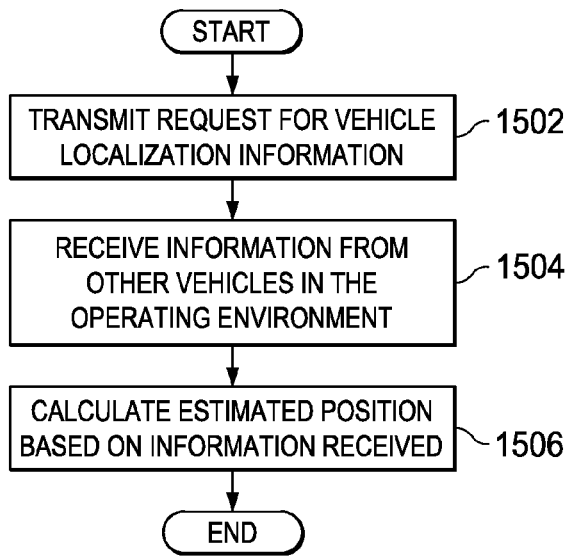
FIG. 15 is a flowchart illustrating a process for requesting localization information from another vehicle in accordance with an illustrative embodiment.

With reference now to FIG. 15, a flowchart illustrating a process for requesting localization information from another vehicle is depicted in accordance with an illustrative embodiment. The process may be implemented by machine controller 402 utilizing communications unit 412 in FIG. 4. This process may be implemented by a vehicle that is unable to obtain needed information, such as sensor data. In these examples, needed sensor data is any sensor data that is needed to control the vehicle. The sensor data may be, for example, data needed to perform localization.

The process begins by transmitting a request for vehicle localization information (step 1502) to other vehicles working in the same worksite. For example, in an illustrative embodiment, agricultural vehicle 106 in FIG. 1 may lose global positioning system capabilities and be unable to determine a global position estimate. Agricultural vehicle 106 may transmit the request for localization information to agricultural vehicles 104 and 108 in order to utilize the sensor information detected from the sensor system on each of agricultural vehicles 104 and 108 respectively to determine the position estimate of agricultural vehicle 106.

Next, the process receives information from other vehicles in the operating environment (step 1504). The information may be referred to as alternate information and may include alternate sensor data. In other examples, the information also may include information from an online knowledge base that may not be reachable by the vehicle if a communications unit has failed.

In an illustrative embodiment, the sensor information received from other vehicles, such as agricultural vehicles 104 and 108 in FIG. 1, may indicate the position estimate of each vehicle based on global positioning system information, as well as a relative position estimate of each vehicle in relation to the requesting vehicle, such as agricultural vehicle 106 in FIG. 1. Agricultural vehicle 106 may then use the position estimate of each vehicle and the relative position estimate of each vehicle in relation to agricultural vehicle 106 to determine a position estimate of agricultural vehicle 106. Information received may also include, without limitation, data indicating the distance of one vehicle from another vehicle and the angle or trajectory of a vehicle. The process then calculates an estimated position based on the information received (step 1506), with the process terminating thereafter.

Although this process has been illustrated with respect to obtaining localization information for the vehicle, the process may be applied to obtain other information for localizing other objects. For example, localization information may be requested and received to identify objects around the vehicle. In this manner the vehicle may identify obstacles.

Figure 16:
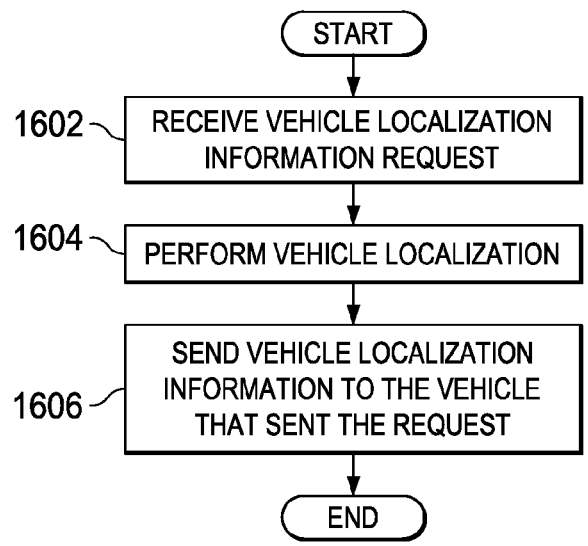
FIG. 16 is a flowchart illustrating a process for transmitting localization information to another vehicle in accordance with an illustrative embodiment.

With reference now to FIG. 16, a flowchart illustrating a process for transmitting localization information to another vehicle is depicted in accordance with an illustrative embodiment. The process may be implemented by machine controller 402 utilizing communications unit 412 in FIG. 4.

The process begins by receiving a vehicle localization information request (step 1602) from another vehicle. For example, a vehicle, such as agricultural vehicle 106, which has lost sensor capabilities necessary for determining a vehicle position estimate, may request information from a sensor system of another vehicle working in the same worksite. Next, the process performs vehicle localization (step 1604), using the sensor system of the vehicle to determine a position estimate of the vehicle in relation to a map or route. Then, the process sends the vehicle localization information to the vehicle that sent the request (step 1606), with the process terminating thereafter.

Figure 17:
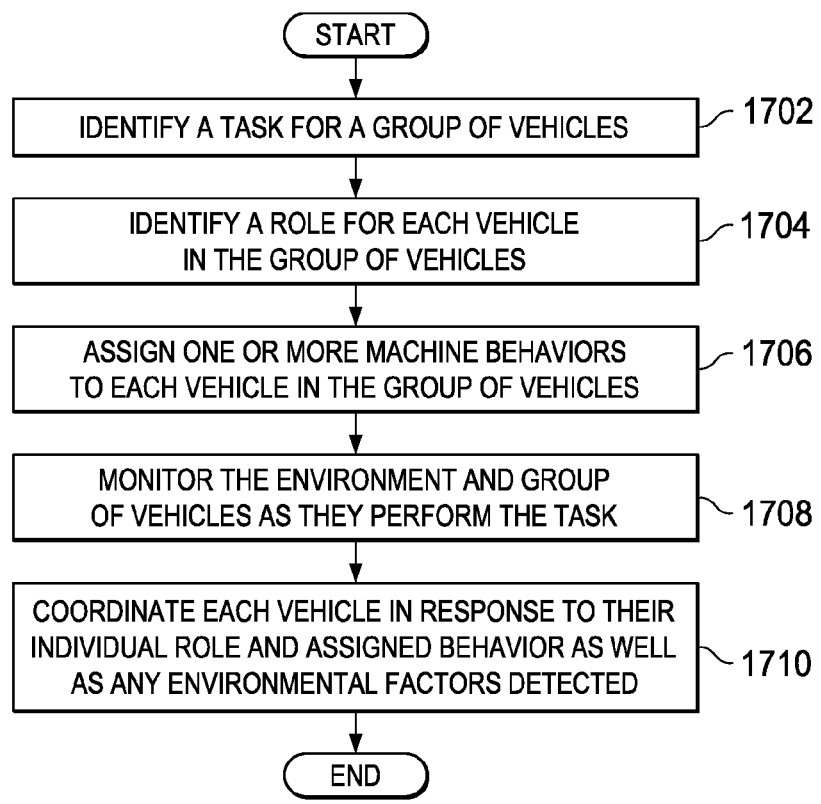
FIG. 17 is a flowchart illustrating a process for coordinating and controlling multiple vehicles in accordance with an illustrative embodiment.

With reference now to FIG. 17, a flowchart illustrating a process for coordinating and controlling multiple vehicles is depicted in accordance with an illustrative embodiment. The process may be implemented by machine controller 402 utilizing communications unit 412 in FIG. 4. The process may also be implemented by a machine controller that is located in a back office, such as back office 102 in FIG. 1.

The process begins by identifying a task for a group of vehicles (step 1702). The task may be, for example, harvesting a field, and the group of vehicles may be agricultural vehicles, such as agricultural vehicles 104, 106, and 108 in FIG. 1. Next, the process identifies a role for each vehicle in the group of vehicles (step 1704). Identified roles may be retrieved from stored role behaviors, such as role behaviors 512 in behavior library 502 in FIG. 5. In an illustrative embodiment, the roles identified may be that of "first," "second," and "third" vehicle.

In another illustrative embodiment, the roles identified may be that of "leader," and "follower." Roles identified may be different for each vehicle in a group of vehicles, or may be the same for some or all vehicles in a group of vehicles. In an example where identified roles are the same for a number of vehicles in a group of vehicles, the location in which each vehicle executes the identified role may be different. Using the example of agricultural vehicles 104, 106, and 108 in FIG. 1, in an illustrative embodiment, agricultural vehicle 106 may be assigned the role of "leader," while agricultural vehicles 104 and 108 are assigned the same role of "follower."

Agricultural vehicles 104 and 108 may be assigned the same role of "follower" but be positioned in different starting locations so as to execute the role of "follower" in different locations. For example, agricultural vehicle 104 may execute the role of "follower" at a set distance to the left of agricultural vehicle 106, the "leader," while agricultural vehicle 108 may execute the role of "follower" at a set distance to the right of agricultural vehicle 106.

The process then assigns one or more machine behaviors to each vehicle in the group of vehicles (step 1706). Machine behaviors, such as machine behaviors 316, 318, and 320 in FIG. 3, may be retrieved from a library of machine behaviors, such as machine coordination behavior library 314 in FIG. 3.

In another illustrative example, machine behaviors may be retrieved from a behavior library, such as behavior library 418 in FIG. 4. Machine behaviors include machine coordination behaviors, role behaviors, mission behaviors, and emergency reactive behaviors, such as those found in behavior library 502 in FIG. 5. Machine behaviors may be assigned by an operator using a computer, such as back office 102 in FIG. 1. Machine behaviors may also be assigned by a control machine, such as high integrity vehicle architecture 300 in FIG. 3, or by a coordinating computer, such as back office 102 in FIG. 1.

Next, the process monitors the environment and the group of vehicles as they perform the task (step 1708). For example, the process may be implemented by the high integrity control system of a vehicle, such as high integrity machine control system 302 in FIG. 3, which monitors the environment and the group of vehicles by receiving information from the other major high integrity systems, such as the high integrity systems illustrated in high integrity vehicle architecture 300 in FIG. 3. The high integrity control system evaluates the current situation in order to determine whether to initiate a new behavior or continue with the current one. Proposed actions, or new behaviors, are then compared across the redundant units of high integrity vehicle architecture 300 to determine the actual action to signal to the vehicle or group of vehicles. This is a classic example of the Byzantine General's problem for fault tolerance. A coordinated behavior for multiple vehicles may result in sequences of more primitive behaviors, such as a path plan begin and end points, being passed to the high integrity control system for execution and status reporting. This may be seen in the harvesting example described above when the agricultural vehicles move from their initial positions to the edge of the field to begin harvesting. The process then coordinates each vehicle in response to their individual roles and assigned behaviors as well as any environmental factors detected (step 1710), with the process terminating thereafter.

Environmental factors that may affect machine coordination include factors detected by a sensor system, such as sensor system 700 in FIG. 7. In an illustrative embodiment, rain sensor 720 may detect rain in the operating environment in which the group of vehicles in process 1700 is performing the task. The process may then coordinate each vehicle in the group of vehicles to slow down their individual rate of propulsion in order to maintain safety in the operating environment.

Figure 18:
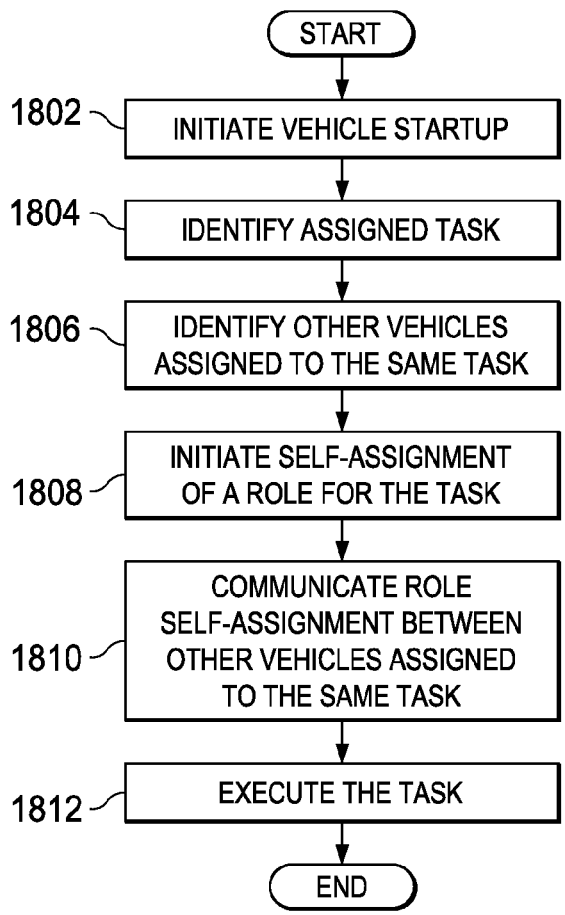
FIG. 18 is a flowchart illustrating a process for autonomous role assignment in accordance with an illustrative embodiment.

With reference now to FIG. 18, a flowchart illustrating a process for autonomous role assignment is depicted in accordance with an illustrative embodiment. The process may be implemented by high integrity coordination system 310 utilizing high integrity communications system 312 in FIG. 3.

The process begins by initiating vehicle startup (step 1802). The process identifies the assigned task (step 1804) for the vehicle, and identifies other vehicles assigned to the same task (step 1806). Next, the process initiates self-assignment of a role for the task (step 1808). In some illustrative embodiments, roles may be assigned by a back office computer, such as back office 102 in FIG. 1, or by a control machine, such as high integrity vehicle architecture 300 in FIG. 3.

In other illustrative embodiments, each individual vehicle executes self-assignment behaviors. In this example, each vehicle in a group of vehicles may initiate a self-assignment process during start-up of the vehicle based on the placement of the vehicle in relation to the other vehicles or in relation to the environment in which the task is to be performed.

Next, the process communicates role self-assignment between other vehicles assigned to the same task (step 1810) and executes the task (step 1812), with the process terminating thereafter.

Figure 19:
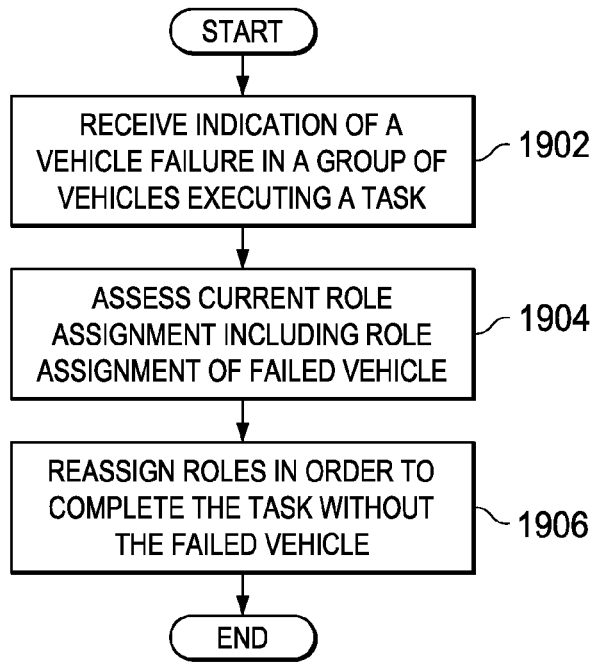
FIG. 19 is a flowchart illustrating a process for autonomous role reassignment in accordance with an illustrative embodiment.

With reference now to FIG. 19, a flowchart illustrating a process for autonomous role reassignment is depicted in accordance with an illustrative embodiment. The process may be implemented by high integrity coordination system 310 utilizing high integrity communications system 312 in FIG. 3. Role reassignment behaviors may be an example of emergency behaviors, such as reactive emergency behaviors 308 in FIG. 3.

The process begins by receiving an indication of a vehicle failure in a group of vehicles executing a task (step 1902). The indication of vehicle failure may be received through a communications system, such as high integrity communications system 312 in FIG. 3. The process assesses current role assignment, including the role assignment of the failed vehicle (step 1904). For example, in an illustrative embodiment, the failed vehicle may have been performing the task according to the role of "follower."

Other vehicles performing the same task may need to assume the role of "follower" or take on the aspect of the assigned task that the failed vehicle was to perform. In another illustrative embodiment, the failed vehicle may have been performing the task according to the role of "leader." In this example, another vehicle in the group of vehicles executing the task will need to assume the role of leader. The process then reassigns roles in order to complete the task without the failed vehicle (step 1906), with the process terminating thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A vehicle comprising:
   a machine controller;
   a steering system;
   a propulsion system;
   a braking system;
   a sensor system having a plurality of different types of sensors;
   a communication system capable of providing communications using a plurality of different types of communications links;
   a library of machine behaviors; and
   a coordination system,
   wherein the machine controller is connected to the steering system, the propulsion system, the braking system, the sensor system, the communication system, the library of machine behaviors, and the coordination system; wherein the communications system provides communication between the vehicle and at least each vehicle in a plurality of vehicles and the coordination system; wherein the library of machine behaviors comprises coordinating behaviors associated with one or more tasks and specific behaviors associated with one or more subtasks for carrying out aspects of the one or more tasks; and wherein the coordination system assigns a role for each one of the plurality of vehicles for carrying out the aspects of the one or more tasks, assigns a number of machine behaviors from the library of machine behaviors to the each one of the plurality of vehicles depending upon the role assigned, and coordinates the vehicle to perform the one or more tasks using the communication system.

2. The vehicle of claim 1, wherein the sensor system, the communication system, and the coordination system are high integrity systems.

3. The vehicle of claim 1, wherein the coordination system coordinates the vehicle according to the coordinating behaviors from the library of machine behaviors and signals received from the sensor system, and wherein the coordinating behaviors comprises role behaviors for the plurality of vehicles carrying out the aspects of the one or more tasks, wherein actions taken by the each one of the plurality of vehicles varies based on the role assigned to the each one of the plurality of vehicles.

4. The vehicle of claim 3, wherein the signals received from the sensor system include a status of at least one of the plurality of vehicles and an external environmental factor.

5. The vehicle of claim 1, wherein the plurality of different types of sensors comprises at least one of a global positioning system, structured light sensor, two dimensional/three dimensional lidar, dead reckoning, infrared camera, visible light camera, radar, ultrasonic sonar, radio frequency identification reader, rain sensor, and ambient light sensor.

6. The vehicle of claim 1, wherein the communication system comprises a plurality of heterogeneous communication channels.

7. The vehicle of claim 6, wherein the plurality of heterogeneous communication channels includes a plurality of data bandwidth options and a plurality of data protocol options.

8. A method performed by a machine controller for coordinating a plurality of vehicles to perform a task, the method comprising:
the machine controller assigning a machine behavior to each of the plurality of vehicles to perform the task to form a plurality of assigned machine behaviors; and
the machine controller coordinating the plurality of vehicles to perform the task using the plurality of assigned machine behaviors assigned and a number of signals received during performance of the task, wherein the number of signals received include a status of at least one of the plurality of the vehicles and an external environmental factor.

9. A method performed by a machine controller for coordinating a plurality of controllable vehicles to perform a task, the method comprising:
the machine controller identifying a role for each one of the plurality of controllable vehicles for carrying out an aspect of the task;
the machine controller assigning a number of machine behaviors to the each one of the plurality of controllable vehicles depending upon the identified role associated with the each one of the plurality of controllable vehicles, wherein the number of machine behaviors are selected from a plurality of coordinating machine behaviors, wherein the plurality of coordinating machine behaviors are stored in a library of machine behaviors, wherein the plurality of coordinating machine behaviors correspond to a plurality of tasks, and wherein each of the plurality of coordinating machine behaviors include specific behaviors for carrying out the aspect of the task; and
the machine controller coordinating the each one of the plurality of controllable vehicles to perform the task according to the number of machine behaviors assigned and signals received during performance of the task, wherein the signals received include at least one of a status of at least one of the plurality of controllable vehicles and an external environmental factor.

10. The method of claim 9, wherein the plurality of controllable vehicles includes vehicles with legs, vehicles with wheels, vehicles with tracks, vehicles with rails, vehicles with wings, vehicles with propellers, vehicles with rudders, and vehicles with rollers.

11. The method of claim 9, wherein the step of assigning the number of machine behaviors to the each one of the plurality of controllable vehicles further comprises:
downloading the number of machine behaviors assigned to a controllable vehicle in the plurality of controllable vehicles having the identified role.

12. The method of claim 9, wherein the external environmental factor is one of an end of a path, a condition of the path, and a change in an operating environment.

13. The method of claim 12, wherein the condition of the path is one of normal, dry, rutted, rocky, muddy, obscured by debris, obscured by ground vegetation, and obscured by an object.

14. The method of claim 12, wherein the change in the operating environment is one of a change in environmental conditions, an object detected in the operating environment, and a person detected in the operating environment.

15. The method of claim 9, further comprising:
determining targeted tasks having a set of behaviors in the library of machine behaviors.

16. A system for coordinating a plurality of controllable vehicles, the system comprising:
a data store having a library of machine behaviors, wherein the library of machine behaviors comprises coordinating behaviors that are used in coordinating operations performed by the plurality of controllable vehicles in executing one or more tasks and specific behaviors for carrying out aspects of the one or more tasks; and
a high integrity coordination system for coordinating each of the plurality of controllable vehicles according to the coordinating behaviors.

17. The system of claim 16, wherein a role is associated with each of the plurality of controllable vehicles, and wherein the coordinating behaviors comprises role behaviors for the plurality of controllable vehicles executing the one or more tasks, wherein actions taken by each vehicle of the plurality of controllable vehicles varies based on the role associated with the each of the plurality of controllable vehicles.

18. The system of claim 16, further comprising:
a high integrity communication system, wherein the high integrity communication system comprises a plurality of heterogeneous communication channels.

19. The system of claim 18, wherein the high integrity coordination system uses the high integrity communication system to assign coordinating behaviors to each of the plurality of controllable vehicles.

20. A method for coordinating a plurality of controllable vehicles by a coordination controller, the method comprising:
the coordination controller identifying a task to be performed by the plurality of controllable vehicles;
the coordination controller identifying a respective role to be assigned to each respective one of the plurality of controllable vehicles to facilitate performing the task;
the coordination controller assigning the task to the plurality of controllable vehicles;
the coordination controller assigning the respective role for the task to each respective one of the plurality of controllable vehicles; and
initiating the plurality of controllable vehicles to execute the task according to the role assigned to each of the plurality of controllable vehicles.

21. A method for coordinated machine behavior, the method comprising:
receiving a power up command;
receiving a task assignment;
receiving a role assignment for the task assignment;
receiving an initiate task assignment command; and
executing the task assignment according to the role assignment received.

22. The method of claim 21, wherein the method is performed by a vehicle, and wherein the task assignment further comprises coordinating behaviors associated with the task assignment that are used by the vehicle to coordinate operations performed by other vehicles in carrying out aspects of the task assignment, wherein the role assignment further comprises specific behaviors for carrying out aspects of the task assignment, and wherein the coordinating behaviors and the specific behaviors are stored in a library of machine behaviors.

23. The method of claim 22, wherein executing the task assignment according to the role assignment received further comprises:
   executing a self-test to ensure on-board systems are running;
   executing a group test check to ensure sensor systems and communication systems are communicating properly;
   executing a role assignment check to ensure each of the plurality of controllable machines is properly identified;
   executing a group library consistency check to ensure required coordinating behaviors and required specific behaviors are consistent across a plurality of controllable machines.

24. The method of claim 22, wherein executing the task assignment according to the role assignment received further comprises:
   monitoring an operating environment;
   detecting an obstacle in the operating environment; and;
   executing obstacle avoidance behaviors to avoid the obstacle in the operating environment during execution of the task assignment.

25. The method of claim 24, wherein the obstacle avoidance behaviors are stored in the library of machine behaviors.

26. The method of claim 21, wherein the role assignment comprises at least one of a lead role, a middle role, and a final role.

27. The method of claim 21, wherein executing the task assignment further comprises:
   maintaining a set distance from other controllable machines in the plurality of controllable machines.

\* \* \* \* \*